(12) United States Patent
Hanks et al.

(10) Patent No.: US 12,274,397 B2
(45) Date of Patent: Apr. 15, 2025

(54) PAPER TOWEL HOLDER, SYSTEM, AND METHOD THEREOF

(71) Applicant: North Atlantic Imports, LLC, Logan, UT (US)

(72) Inventors: Christopher L. Hanks, Nibley, UT (US); Mengyan Li, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 125 days.

(21) Appl. No.: 18/210,648

(22) Filed: Jun. 15, 2023

(65) Prior Publication Data

US 2024/0108169 A1    Apr. 4, 2024

Related U.S. Application Data

(60) Provisional application No. 63/424,215, filed on Nov. 10, 2022, provisional application No. 63/352,959, filed on Jun. 16, 2022.

(51) Int. Cl.
*A47J 37/07*    (2006.01)
*A47K 10/22*    (2006.01)

(52) U.S. Cl.
CPC ........... *A47J 37/0786* (2013.01); *A47K 10/22* (2013.01)

(58) Field of Classification Search
CPC ................................................ A47K 10/3836
See application file for complete search history.

(56) References Cited

U.S. PATENT DOCUMENTS

| | | |
|---|---|---|
| 1,973,354 A | 9/1934 | Nedberg |
| 6,405,973 B1 | 6/2002 | Hollinger |
| 6,776,368 B1 | 8/2004 | Duncan et al. |
| 7,264,197 B2 | 9/2007 | Yu |
| 7,530,525 B2 | 5/2009 | Yang et al. |
| 7,559,504 B2 | 7/2009 | Yang et al. |
| D694,056 S | 11/2013 | Dahle |
| 8,640,894 B1 | 2/2014 | Cronin |
| 10,433,682 B2 | 10/2019 | McNicholas |
| 10,506,900 B1 | 12/2019 | Pagliaro et al. |
| 10,588,461 B2 | 3/2020 | Dahle |
| 10,888,193 B2 | 1/2021 | Dahle et al. |
| 11,272,816 B2 | 3/2022 | Keskin et al. |
| 11,478,113 B1 * | 10/2022 | Spraul ................ A47K 10/3836 |
| 2006/0219837 A1 | 10/2006 | Yang et al. |
| 2011/0271950 A1 * | 11/2011 | Nilssen, II .......... A47J 37/0786 |
| | | 206/541 |
| 2013/0112802 A1 * | 5/2013 | Griggs ............... A47J 37/0786 |
| | | 242/590 |
| 2013/0168487 A1 | 7/2013 | Cheng |

(Continued)

*Primary Examiner* — William A. Rivera
(74) *Attorney, Agent, or Firm* — David L. Stott

(57) ABSTRACT

Embodiments of a paper towel holder, system and method thereof are provided. The paper towel holder includes a bracket, a sleeve, a pin and an arm. The bracket is sized and configured to be coupled to a main body of a cooking system. The sleeve defines a hollow portion to receive the pin with an axis extending axially through the sleeve, the sleeve being coupled to the bracket. The arm includes at least one opening so as to be rotatably coupled to the pin. The at least one opening in the arm extends to define a keyed shape that corresponds with a square shaped outer periphery of the sleeve such that the arm is rotatable about the pin and can be moved to different orientations about the pin.

17 Claims, 13 Drawing Sheets

(56) References Cited

U.S. PATENT DOCUMENTS

| | | |
|---|---|---|
| 2017/0135534 A1 | 5/2017 | Shaw |
| 2017/0156457 A1 | 6/2017 | Wilcox |
| 2017/0273516 A1* | 9/2017 | McNicholas .......... A47K 10/22 |
| 2017/0360265 A1* | 12/2017 | Yocom ................ A47K 10/3836 |
| 2019/0274476 A1* | 9/2019 | Dahle ................... A47J 47/005 |
| 2021/0007550 A1 | 1/2021 | Puertas et al. |
| 2021/0251423 A1* | 8/2021 | Dahle ................. A47J 37/0786 |
| 2021/0321833 A1 | 10/2021 | Madden |
| 2023/0087324 A1* | 3/2023 | Chung ................ A47J 37/0704 108/50.13 |
| 2023/0132862 A1* | 5/2023 | Spinney ................. F24B 1/193 126/25 R |

* cited by examiner

PAPER TOWEL HOLDER, SYSTEM, AND METHOD THEREOF

CROSS-REFERENCE TO RELATED APPLICATIONS

This application claims the benefit of U.S. Provisional Application No. 63/424,215, filed Nov. 10, 2022, as well as U.S. Provisional Application No. 63/352,959, filed Jun. 16, 2022, the disclosures of which are hereby incorporated by reference herein in their entirety.

TECHNICAL FIELD

The present invention relates generally to outdoor cooking systems and, more specifically, the present invention relates to securing a paper towel roll to an outdoor cooking system.

BACKGROUND

Outdoor cooking has become more popular and accessible in places other than the backyard of a home. Many outdoor cooking systems can be taken to outdoor recreational areas like campsites, parks, or sports events. However, like most cooking, outdoor cooking can be messy and unpredictable. In outdoor recreational areas there are many factors of which can contribute to the mess or make cleaning the mess harder; these factors may include adverse weather like wind or rain. Further, the ability to secure supplies that help to keep the outdoor cooking system and surrounding area clean can be challenging when there are adverse weather conditions.

BRIEF SUMMARY OF THE INVENTION

The present invention is directed to various embodiments of a paper towel holder, a cooking system, and a method thereof. In one embodiment, the paper towel holder configured to hold a paper towel roll for use on an outdoor cooking station is provided. The paper towel holder includes a bracket, a sleeve, a pin, a spring, and an arm. The bracket is configured to be coupled to a main body of the cooking station, the bracket extending to define a c-shaped structure with an upper extension and a lower extension. The upper extension includes an upper opening defined therein and the lower extension includes a lower opening defined therein, the upper opening and the lower opening positioned to be aligned so as to axially define an axis therethrough and between each of the upper and lower openings. The sleeve defines a bore extending therethrough, the sleeve positioned between the upper and lower extensions and adjacent one of the upper and lower extensions such that a bore axis of the sleeve is coaxial with the axis of the upper and lower openings. The sleeve includes a non-round shaped outer periphery. The pin is configured to be positioned through the bore of the sleeve through the upper and lower openings of the respective upper and lower extensions. The spring is configured to be positioned between the upper and lower extensions and coupled to the pin. The arm is sized and configured to receive the paper towel roll, the arm having multiple bends along a length of the arm. The arm includes one end portion with at least one arm opening with a keyed profile, the keyed profile configured to correspond with the non-round shaped outer periphery of the sleeve such that the one end portion of the arm is configured to be coupled to the pin with the pin extending through the at least one arm opening.

In another embodiment, the arm is positionable relative to the main body of the cooking station in at least one of a use position and a storage position. In another embodiment, the arm may be moved between the use and storage positions by compressing the spring so that at least one arm opening of the arm is withdrawn from sleeve so that the arm may be rotated about the axis. In another embodiment, the arm extends with a flat structure with the bends to minimize movement of the paper towel roll on the arm.

In another embodiment, the bends along the length of the arm include at least four bends. In another embodiment, the arm includes a free end, the arm extending upward to the free end of the arm. In still another embodiment, the non-round shaped outer periphery of the sleeve includes a square shaped outer periphery.

In accordance with another embodiment of the present invention, a cooking station configured to hold a paper towel roll thereto is provided. The cooking station includes a main body and a paper towel holder. The main body includes heating elements supported by the main body. The paper towel holder includes a bracket, a sleeve, a pin, a spring, and an arm. The bracket is configured to be coupled to the main body, the bracket extending to define a c-shaped structure with an upper extension and a lower extension. The upper extension includes an upper opening defined therein and the lower extension includes a lower opening defined therein, the upper opening and the lower opening positioned to be aligned so as to axially define an axis therethrough and between each of the upper and lower openings. The sleeve defines a bore extending therethrough, the sleeve positioned between the upper and lower extensions and adjacent one of the upper and lower extensions such that a bore axis of the sleeve is coaxial with the axis of the upper and lower openings. The sleeve includes a non-round shaped outer periphery. The pin is configured to be positioned through the bore and upper and lower openings of the respective upper and lower extensions. The spring is configured to be positioned between the upper and lower extensions and coupled to the pin. The arm is sized and configured to receive the paper towel roll, the arm having multiple bends along a length of the arm. The arm includes one end portion with at least one arm opening with a keyed profile, the keyed profile configured to correspond with the non-round shaped outer periphery of the sleeve such that the one end portion of the arm is configured to be coupled to the pin with the pin extending through the at least one arm opening.

In another embodiment, the arm is positionable relative to the main body of the cooking station in at least one of a use position and a storage position. In still another embodiment, the arm may be moved between the use and storage positions by compressing the spring so that at least one arm opening of the arm is withdrawn from sleeve so that the arm may be rotated about the axis. In another embodiment, the arm extends with a flat structure with the bends to minimize movement of the paper towel roll on the arm.

In another embodiment, the bends along the length of the arm include at least four bends. In another embodiment, the arm includes a free end, the arm extending upward to the free end of the arm. In still another embodiment, the non-round shaped outer periphery of the sleeve includes a square shaped outer periphery.

In accordance with another embodiment of the present invention, a method for maintaining a paper towel roll in a stationary position and connected to an outdoor cooking station is provided. The method includes the steps of: providing a paper towel holder having a bracket, a sleeve, a pin, a spring and an arm, the bracket extending to define a c-shaped structure with an upper extension and a lower extension, the upper and lower extensions define an upper opening and a lower opening therein, respectively, such that the upper and lower openings are aligned so as to axially define an axis through the upper and lower openings, the sleeve defining a bore and positioned between the upper and lower extensions and adjacent one of the upper and lower openings, the sleeve having a non-round shaped outer periphery, the pin configured to be positioned through the bore and the upper and lower openings of the respective upper and lower extensions, the arm having multiple bends along a length of the arm, the arm having one end portion with at least one arm opening with a keyed profile, the keyed profile configured to correspond with the non-round shaped outer periphery of the sleeve such that the one end portion of the arm is configured to be coupled to the pin with the pin extending through the at least one arm opening; and positioning a paper towel roll over the bends of the arm so that a paper shaft of the paper towel roll warps over the arm and becomes stationary relative to the arm.

In another embodiment, the method includes the step of moving the arm of the paper towel holder from a use position to a storage position. In still another embodiment, the moving step includes the step of compressing the spring so that the at least one arm opening of the arm is withdrawn from the sleeve so that the arm is moveable to rotate about the axis.

In accordance with another embodiment of the present invention, a paper towel holder configured to hold a paper towel roll for use on an outdoor cooking system is provided. The paper towel holder includes a bracket, a sleeve, an arm and a coupling insert. The bracket is sized and configured to be coupled to a main body of the cooking system. The sleeve defines a hollow portion therein with an axis extending axially through the sleeve, the sleeve being coupled to the bracket and extending between a first end and a second end. The arm extends from the coupling insert such that the coupling insert is configured to be positioned within the hollow portion of the sleeve so that the arm extends substantially perpendicular relative to the axis defined by the sleeve. With this arrangement, the arm is sized and configured to fit within a bore of the power towel roll.

In another embodiment, the first end of the sleeve extends to define at least two notches therein. In still another embodiment, the coupling insert is moveable to any one of the at least two notches to position the arm in one of a use position or a storage position. In another embodiment, the coupling insert extends to define a coupling portion and spring portion, the coupling portion configured to extend adjacent the first end of the sleeve and the spring portion extending adjacent the second end of the sleeve, the coupling portion being coupled to the arm. In yet another embodiment, the coupling insert extends with a notch insert, the notch insert being sized to be positioned within any one of the at least two notches, and the notch insert being spring biased to be maintained within any one of the at least two notches. In another embodiment, the arm includes a lip sized and configured to hold the paper towel roll on the arm. In another embodiment, the coupling insert includes a weighted arm extending therefrom, the weighted arm configured to rest over an outside surface of the paper towel roll.

In accordance with another embodiment of the present invention, a paper towel holder configured to hold and secure a paper towel roll to an outdoor cooking system is provided. The paper towel holder includes a bracket, a sleeve, an arm and a coupling insert. The bracket is sized and configured to be coupled to a main body of the cooking system. The sleeve is coupled to the bracket and extending between a first end and a second end, the sleeve defining a hollow portion therein with an axis extending axially through the sleeve. The arm extends from the coupling insert, the coupling insert configured to be positioned within the sleeve so that the arm extends substantially perpendicular relative to the axis of the sleeve. Such arm extends with multiple bends along a length thereof. With this arrangement, the arm with the bends sized and configured to fit within a bore of the paper towel roll with an interference fit such that the arm with the bends holds the paper towel roll thereto.

In another embodiment, the first end of the sleeve extends to define at least two notches therein. In another embodiment, the sleeve extends to define three notches therein. In still another embodiment, the coupling insert defines a pin hole therein, the pin hole sized to receive a pin such that, upon the coupling insert being positioned within the hollow portion of the sleeve, the pin is configured to extend through one of the at least two notches to position the arm in one of a use position or storage position. In another embodiment, the arm with the bends is flexible such that the arm is moveable from a relaxed state to a tension state. In another embodiment, upon the arm being positioned within the bore of the paper towel roll, the arm is in the tension state.

In accordance with another embodiment of the present invention, a cooking system for effectively holding a paper towel roll in windy conditions is provided. The cooking system includes an outdoor cooking station and a paper towel holder, the paper towel holder having a bracket, a sleeve, an arm and a coupling insert. The cooking station extends with a main body. The bracket of the paper towel holder is coupled to the main body. The sleeve defines a hollow portion therein with an axis extending axially through the sleeve, the sleeve coupled to the bracket and extending between a first end and a second end. The arm extends from a coupling insert. The coupling insert is configured to be positioned within the hollow portion of the sleeve so that the arm extends substantially perpendicular relative to the axis defined by the sleeve, the arm sized and configured to fit within a bore of the paper towel roll.

In another embodiment, the first end of the sleeve extends to define at least two notches therein, wherein the coupling insert is moveable to any one of the at least two notches to position the arm in one of a use position or a storage position. In another embodiment, the sleeve includes three notches. In another embodiment, the coupling insert extends to define a coupling portion and spring portion, the coupling portion configured to extend adjacent the first end of the sleeve and the spring portion extending adjacent the second end of the sleeve, the coupling portion being coupled to the arm. In another embodiment, the coupling insert extends with a notch insert, the notch insert being sized to be positioned within any one of the at least two notches, and the notch insert being spring biased via a spring to be maintained within any one of the at least two notches. In still another embodiment, the coupling insert includes a weighted arm extending therefrom, the weighted arm configured to rest over an outside surface of the paper towel roll. In yet another embodiment, the arm extends with multiple bends along a length thereof, the arm with the bends sized and configured to fit within a bore of the paper towel roll with an interference fit such that the arm with the bends holds the paper towel roll thereto.

In accordance with another embodiment of the present invention, a method for effectively holding a paper towel roll to an outdoor cooking system in windy conditions is provided. The method includes the steps of: providing a paper towel holder having a bracket, a sleeve, and an arm, the bracket sized and configured to be coupled to a main body of the cooking system, the sleeve coupled to the bracket and extending between a first end and a second end, the sleeve defining a hollow portion therein with an axis extending axially through the sleeve, the arm extending from a coupling insert configured to be positioned within the hollow portion of the sleeve so that the arm extends substantially perpendicular relative to the axis defined by the sleeve; applying an upward force to the arm to move a notch insert of the coupling insert from a first notch of at least two notches defined in the sleeve adjacent the first end thereof; pivoting the arm about the axis defined by the sleeve and aligning the notch insert adjacent to a second notch of the at least two notches to then position the notch insert within the second notch of the at least two notches, the at least two notches corresponding to the arm being in a use position or a storage position; and positioning the arm in the use position for receiving the paper towel roll such that the arm is insertable into a bore of the paper towel roll.

In another embodiment, the method step of applying the upward force includes manually lifting the arm against a spring biasing the coupling insert downward. In still another embodiment, the method further includes positioning a paper towel on to the arm and positioning a weighted arm to rest over an outside surface of the paper towel roll, the weighted arm being coupled to the coupling insert. In another embodiment, the method further includes inserting the arm through the bore of the paper towel roll with an interference fit such that the arm extends with multiple bends along a length thereof.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
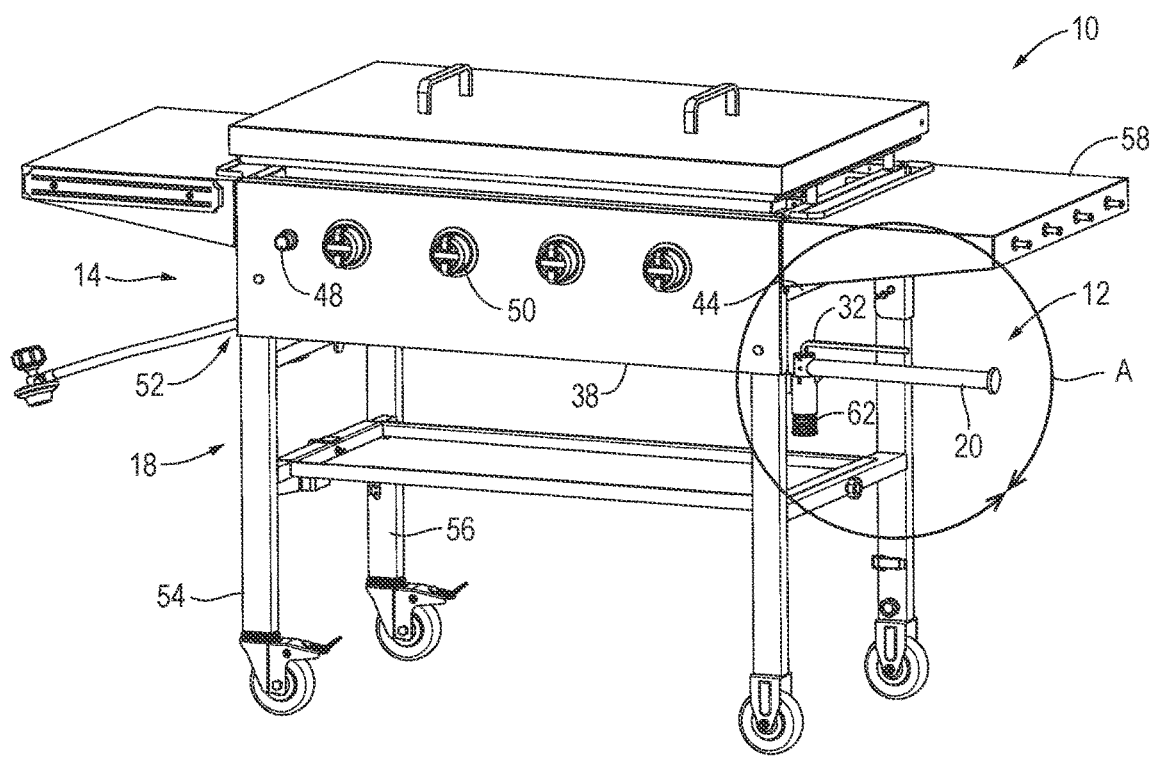
FIG. 1 is a perspective view of an outdoor cooking system with a paper towel holder, according to an embodiment of the present invention.
Figure 1A:
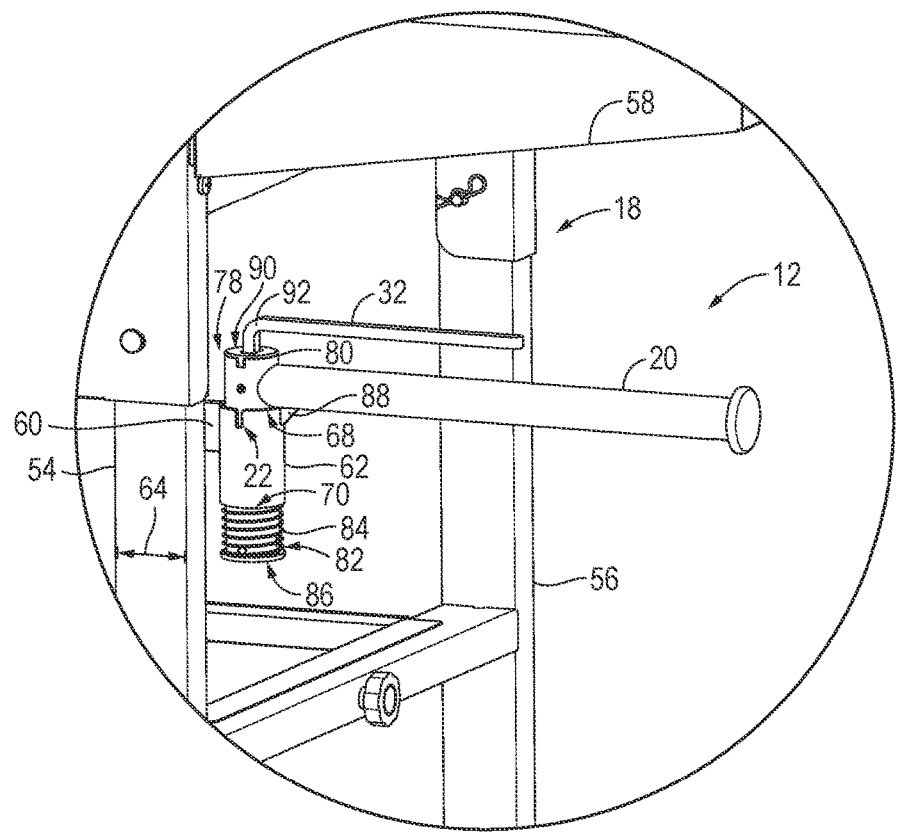
FIG. 1A is an enlarged view of a portion of the outdoor cooking system taken from region A in FIG. 1, depicting the paper towel holder in a locked use position, according to another embodiment of the present invention.
Figure 1B:
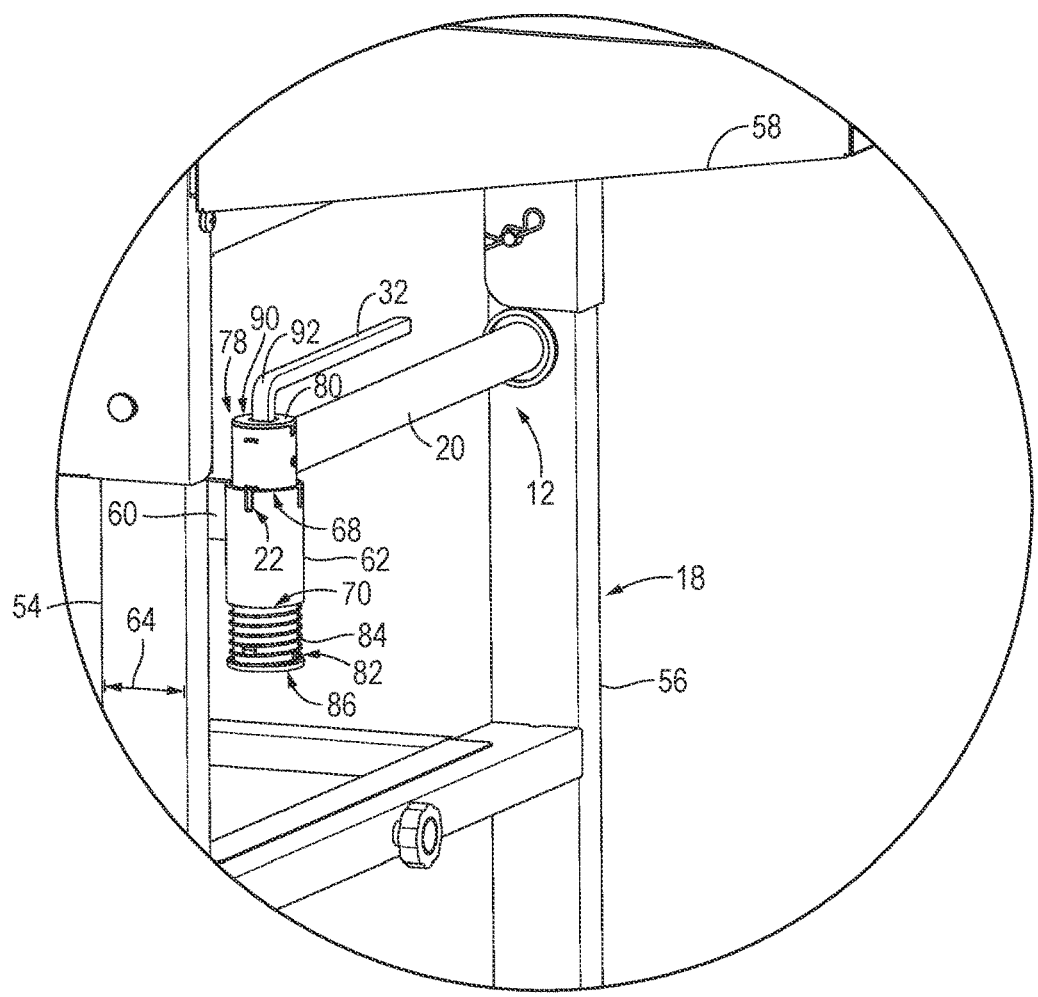
FIG. 1B is an enlarged view of the paper towel holder, depicting the paper towel holder in a locked storage position, according to another embodiment of the present invention.
Figure 6:
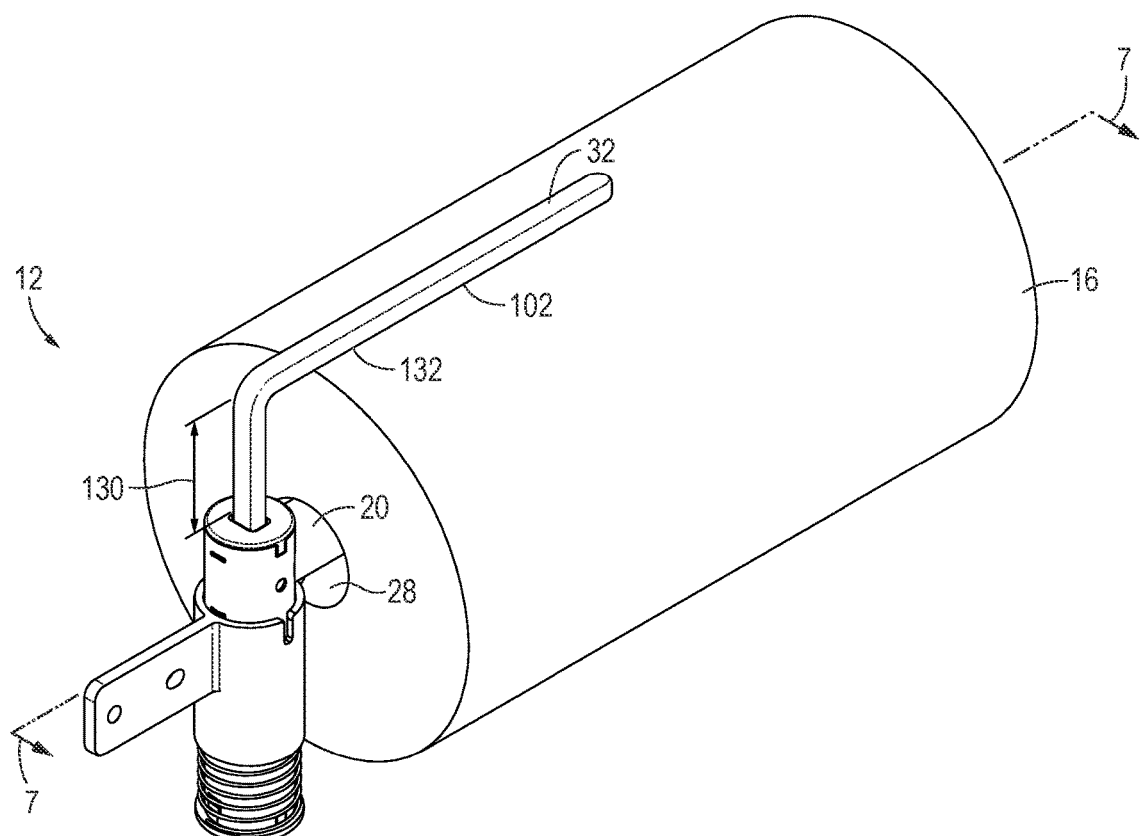
FIG. 6 is a perspective view of the paper towel holder, depicting a paper towel roll positioned on the arm of the paper towel holder, the arm being in the locked use position, according to another embodiment of the present invention.

Referring to FIG. 1, an outdoor cooking system 10 or cooking station with a paper towel holder 12 is provided. In one embodiment, the outdoor cooking system 10 may include a main body 14 and a paper towel holder 12. The paper towel holder 12 may be adjustable and sized and configured to hold a paper towel roll 16 (FIG. 6) thereto. The paper towel holder 12 may be sized and configured to be coupled to legs 18 of the main body 14 such that an arm 20 of the paper towel holder 12 may extend substantially perpendicular to the legs 18. Further, the paper towel holder 12 may include three notches 22 (FIG. 1A) such that the arm 20 is pivotably adjustable from a use position (FIG. 1A) to a storage position (FIG. 1B). The arm 20 of the paper towel holder 12 may be sized and configured to be inserted through a bore 28 (FIG. 6) of the paper towel roll 16 (FIG. 6). Further, the arm 20 may extend linearly such that the arm 20 may readily receive the paper towel roll thereon. The paper towel holder 12 may extend to define a weighted arm 32 such that the weighted arm 32 may rest on the paper towel roll 16 (FIG. 6) and hold the paper towel roll 16 (FIG. 6) in position such that wind may not cause the paper towel roll to unravel or unroll.

Now with reference to FIGS. 1-1B, as previously set forth, the outdoor cooking system 10 may include the main body 14. The main body 14 may extend to define a front panel 38, rear panel 40, left panel 42, and right panel 44 that may each extend to define an inner portion 46. The inner portion 46 may include heating elements such as gas burners. Further, the inner portion 46 may include an ignition button 48, gas line, burner knobs 50 and the necessary components and connections to the burners for the burners to be operable and produce heat as known to one of ordinary skill in the art. For example, the outdoor cooking system 10 of the present invention may include similar structure and functionality as the cooking station or cooking system disclosed in commonly owned U.S. patent application Ser. No. 17/184,535, filed on Feb. 24, 2021 and entitled "PORTABLE OUTDOOR COOKING DEVICE, SYSTEM, AND ACCESSORY THEREOF," the disclosure of which is incorporated by reference herein in its entirety. Furthermore, the front panel 38 and rear panel 40 may extend to define the legs 18 such that the legs 18 extend from corners 52 where the front panel 38 is coupled to the left and right panel 42, 44 defining frontward legs 54 and the rear panel 40 is coupled to the left and right panel 42, 44 defining rearward legs 56. The legs 18 may extend vertically towards a ground surface. Further, the legs 18 may include accessories attached or coupled thereon, such as the paper towel holder 12.

Figure 3:
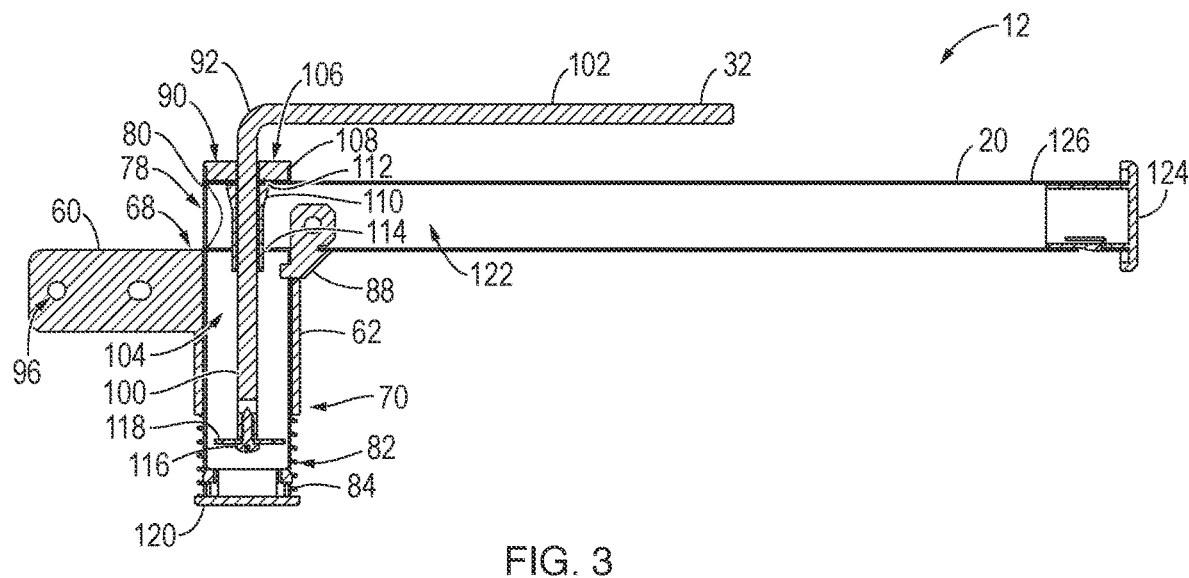
FIG. 3 is a cross-sectional view of the paper towel holder taken along section line 3-3 in FIG. 2, according to another embodiment of the present invention.

The paper towel holder 12 may be attached along the length of the frontward legs 54 or the rearward legs 56 of the main body 14. Further, the paper towel holder 12 may be attached to other portions of the main body 14 such as the left or right panel 42, 44 of the main body 14 or a side shelf 58 of the main body. The paper towel holder 12 may extend to include a bracket 60, sleeve 62, and the arm 20. The bracket 60 may be coupled to the legs 18 of the main body 14 such that the bracket 60 extends past a width 64 of the legs 18 to be coupled to the sleeve 62 of the paper towel holder 12. The sleeve 62 may be coupled to the bracket 60 such that the sleeve 62 is in a vertical position and is extending parallel to the legs 18 out from the width 64 of the legs 18. The sleeve 62 may extend to be multiple shapes, such as circular, to define a hollow center 66 (FIG. 3). Further, the sleeve 62 may extend to define a first end 68 and second end 70. The first end 68 may extend to define the three notches 22 such that one notch 22 is positioned on each side of the sleeve 62, excluding the side for which the sleeve 62 is coupled to the bracket 60. The notches 22 may define a front notch 72 (FIG. 4), center notch 74 (FIG. 4), and rear notch 76 (FIG. 4A). In one embodiment, the front notch 72 (FIG. 4) and center notch 74 (FIG. 4) may correspond with the use position (FIG. 1A) while the rear notch 76 (FIG. 4A) may correspond with the storage position (FIG. 1B). In another embodiment, the sleeve 62 may extend to define at least two notches 22, the at least two notches 22 including one of a use position or a storage position.

The hollow center 66 (FIG. 3) or hollow portion of the sleeve 62 may be sized and configured to fit a coupling insert 78 such that the coupling insert 78 may be moveable within the hollow center 66. The coupling insert 78 may extend to define a coupling portion 80 and spring portion 82 such that the coupling portion 80 extends beyond the first end 68 of the sleeve 62 and the spring portion 82 extends beyond the second end 70 of the sleeve 62. The spring portion 82 may include a spring 84 extending from the second end 70 of the sleeve 62 to a bottom 86 of the coupling insert 78. The coupling portion 80 may be coupled to the arm 20 such that the arm 20 may extend perpendicular from the coupling portion 80. The arm 20 and coupling portion 80 may also be coupled to a notch insert 88. The notch insert 88 may be sized and configured to fit into the notches 22 such that the notch insert 88 may lock the arm 20 and coupling insert 78 in place. The coupling insert 78 may be moveable vertically and horizontally. The arm 20 and notch insert 88 may be fixed to the coupling insert 78 such that the arm 20 and notch insert 88 may move with the coupling insert 78. Further, the coupling portion 80 may extend to define a weighted arm 32 positioned at a top 90 of the coupling insert 78. The weighted arm 32 may extend upwards from the top 90 of the coupling insert 78 to define an angle 92 such that the angle 92 may change the direction for which the weighted arm 32 extends. The angle 92 may change the direction of the weighted arm 32 to extend above and parallel to the arm 20. The arm 20 may extend linearly such that the bore 28 (FIG. 6) of the paper towel roll 16 (FIG. 6) may readily receive the arm 20. Further, as previously set forth, the hollow center 66 (FIG. 3) of the sleeve 62 may be sized and configured to fit a coupling insert 78 such that the coupling insert 78 may be moveable within the hollow center 66 (FIG. 3).

Figure 2:
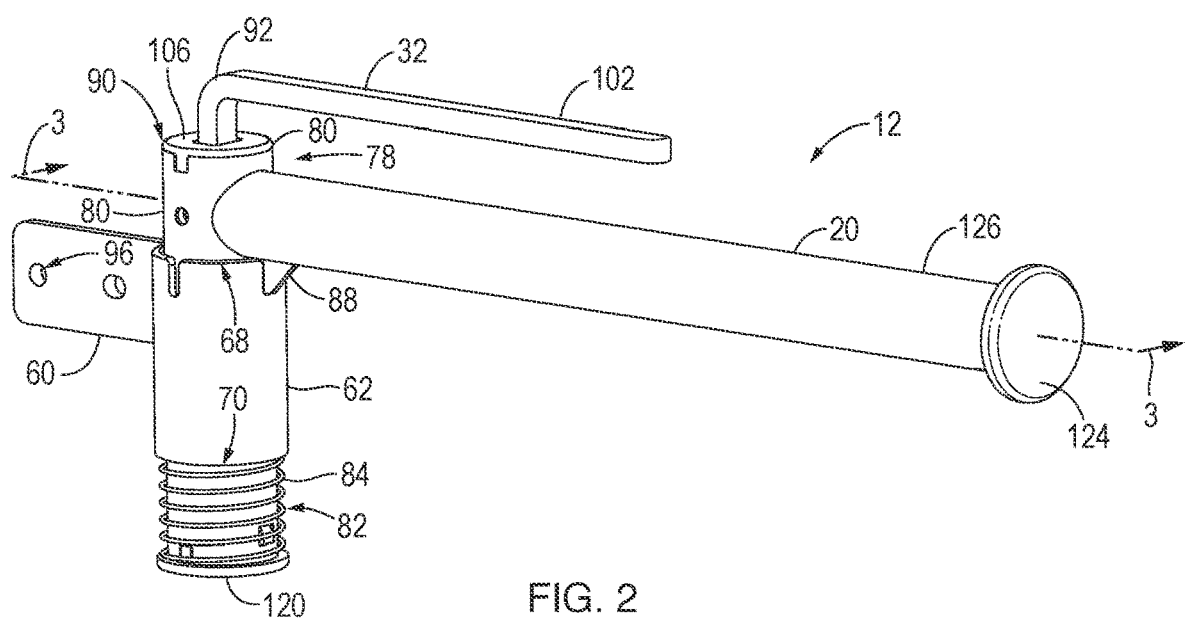
FIG. 2 is a perspective view of the paper towel holder, depicting the paper towel holder in the locked use position, according to another embodiment of the present invention.
Figure 5:
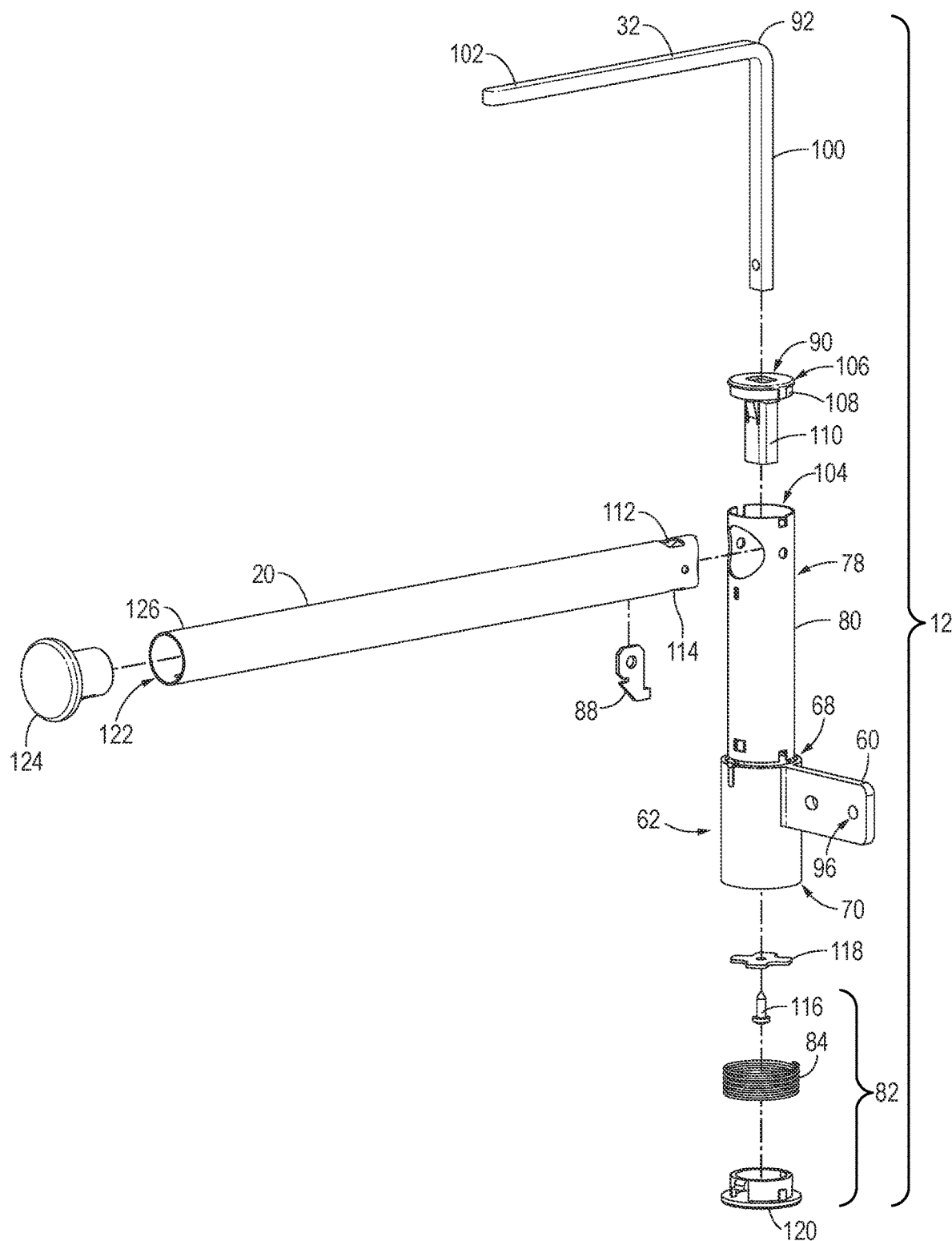
FIG. 5 is an exploded view of the paper towel holder, according to another embodiment of the present invention.

Now with reference to FIGS. 2, 3, and 5, the bracket 60 may extend to define screw holes 96. The screw holes 96 may be sized and configured to take screws 98 such that the screws 98 may couple the bracket 60 to the main body 14 (FIG. 1) of the outdoor cooking system 10 (FIG. 1). Further, the bracket 60 may be coupled on the first end 68 of the sleeve 62. The weighted arm 32 may extend to define a vertical portion 100 and a horizontal portion 102. The vertical portion 100 may extend from an interior 104 of the coupling insert 78 such that the vertical portion 100 may extend from the spring portion 82, through the coupling portion 80, and out of the top 90 of the coupling insert 78. The weighted arm 32 may extend out of the top 90 of the coupling insert 78 towards the angle 92 of the weighted arm 32. The angle 92 may change the direction of which the weighted arm 32 is extending such that the weighted arm 32 shifts from extending vertically to extending horizontally. The horizontal portion 102 may extend perpendicular to the coupling insert 78 and parallel with the arm 20 of the paper towel holder 12.

The coupling insert 78 may include the coupling portion 80 and spring portion 82. The coupling portion 80 may include a top insert 106 such that the top insert 106 may be located at the top 90 of the coupling insert 78. The top insert 106 may include a plate 108 and a casing 110. The casing 110 may be sized and configured to allow for the vertical portion 100 of the weighted arm 32 to fit and extend through the casing 110. The plate 108 may be sized and configured to fit and close the top 90 of the coupling insert 78 such that the casing 110 may extend within the interior 104 of the coupling insert 78. The arm 20 may be coupled to the coupling portion 80 of the coupling insert 78 such that the arm 20 may extend within the interior 104 of the coupling insert 78. Further, the arm 32 may include a top opening 112 and bottom opening 114. The top opening 112 may be positioned above the bottom opening 114 and the top opening 112 and bottom opening 114 may be located in the interior 90 of the coupling insert 78. Further, the top opening 112 and bottom opening 114 may be sized and configured to fit the casing 110 such that the casing 110 may extend into the top opening 112, through the arm 20, and out the bottom opening 114 of the arm 20. The coupling portion 80 may extend past the second end 70 of the sleeve 62 such that the coupling portion 80 and spring portion 82 may be fixedly coupled by a tack 116 and a washer 118. The spring 84 may extend to the second end 70 of the sleeve 62 such that the spring 84 may extend over the exposed portions of the coupling portion 80 and spring portion 82. The spring portion 82 may also include a bottom cap 120 sized and configured to close off the interior 104 of the coupling insert 78. The tack 116 may be positioned to stop the vertical portion 100 of the weighted arm 32 from extending further down the coupling insert 78.

The arm 20 and coupling portion 80 may be coupled to the notch insert 88 such that the notch insert 88 may be coupled to the interior 104 of the coupling insert 78 and within an inside portion 122 of the arm 20. The arm 20 may also include a cap 124 sized and configured to close off the inside portion 122 of the arm 20. The cap 124 may extend past a periphery 126 of the arm 20 to exhibit a lip such that the cap 124 may assist in holding the bore 28 (FIG. 6) of the paper towel roll 16 (FIG. 6) on the arm 20.

Figure 4:
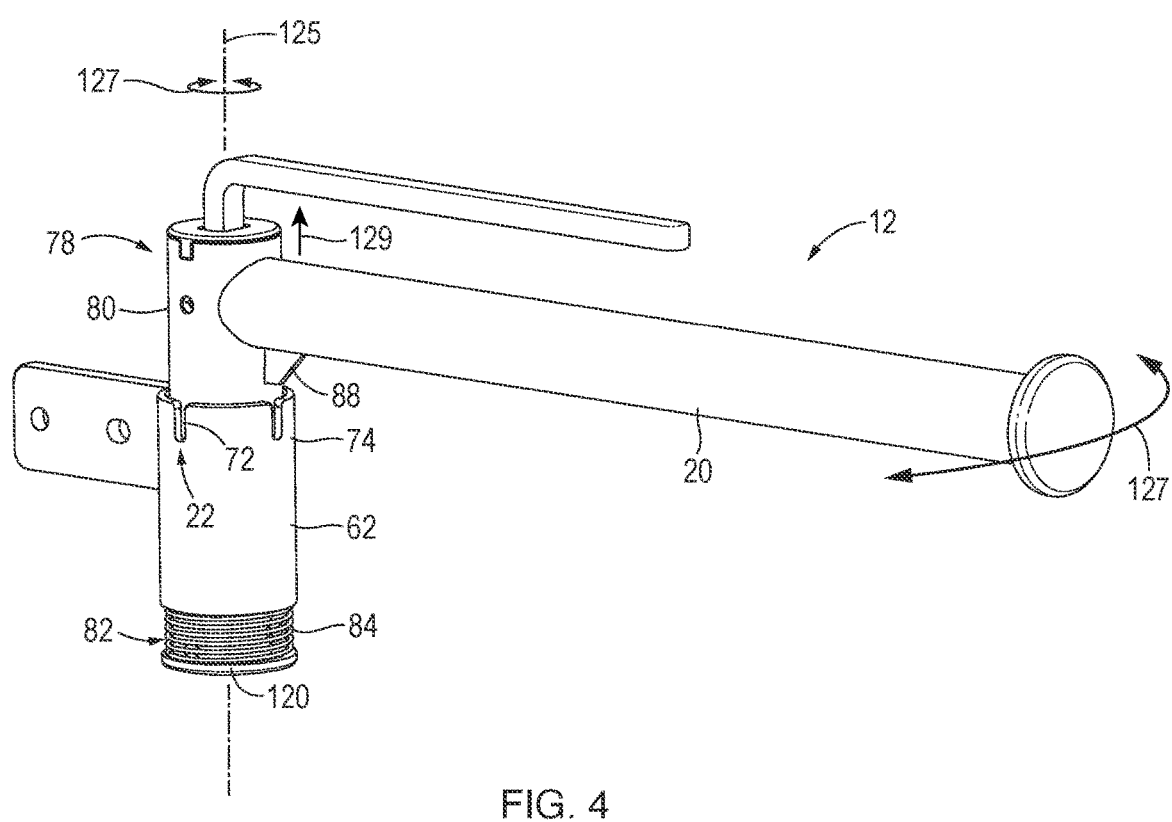
FIG. 4 is a perspective view of the paper towel holder, depicting an arm of the paper towel holder unlocked from the locked use position or the arm positioned in an unlocked position adjacent to the use position, according to another embodiment of the present invention.
Figure 4A:
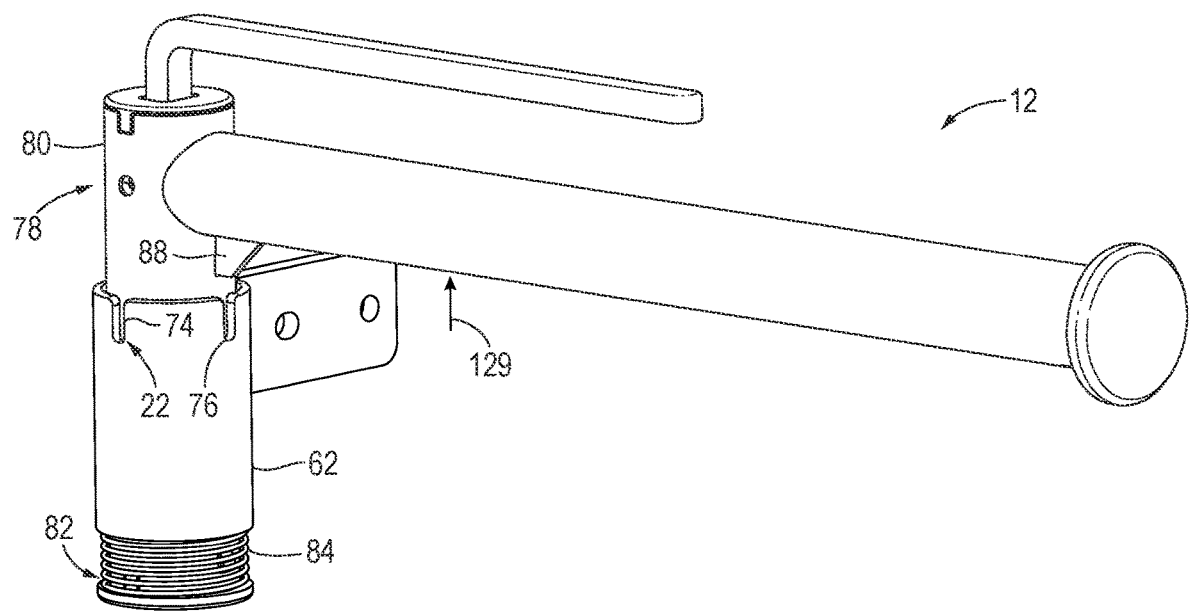
FIG. 4A is a perspective view of the paper towel holder, depicting an arm of the paper towel holder unlocked from the locked storage position or the arm positioned in an unlocked position adjacent to the locked storage position, according to another embodiment of the present invention.
Figure 4B:
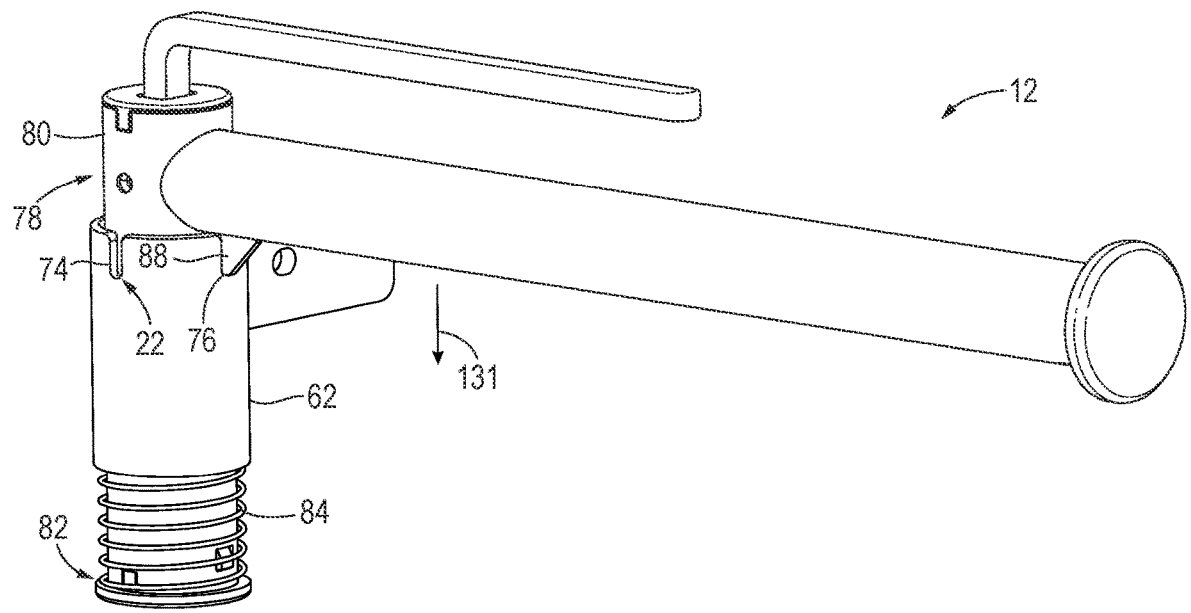
FIG. 4B is a perspective view of the paper towel holder, depicting an arm of the paper towel holder positioned in the locked storage position, according to another embodiment of the present invention.

Now with reference to FIGS. 4-4B, the notches 22 of the sleeve 62 may correspond to the use position or the storage position (see respective FIGS. 1A, 1B) such that the front notch 72 and center notch 74 may correspond to the use position and the rear notch 76 may correspond to the storage position. The notch insert 88 may be positioned in one of the notches 22 such that the paper towel holder 12 may be locked into the position for which the notch 22 corresponds. Further, the notch insert 88 may be unlocked when the notch insert 88 is not positioned (or removed from) within a notch 22 and the notch insert 88 may be locked when the notch insert 88 is positioned within the notch 22. Even further, the notch insert 88 being unlocked may correspond to the paper towel holder 12 being unlocked and the notch insert 88 being locked may correspond to the paper towel holder 12 being locked. In one embodiment, the coupling insert 78 may be adjusted by moving the coupling insert 78 from one of the notches 22 and pivoting the coupling insert 78 and the arm 20 about an axis 125, as shown by rotational arrow 127, to another one of the notches 22, the axis 125 extending axially through the hollow portion 66 (and along a longitudinal length) of the sleeve 62 (see FIG. 4). Such moving from one notch to another may be employed by lifting vertically along axis 125 upon the coupling portion 80 and/or arm 20, as shown by arrow such that the spring 84 of the spring portion 82 may compress and the notch insert 88 may become unlocked from its respective notch 22. The notch insert 88 being unlocked may then allow for the coupling insert 78 and the arm 20 to be pivoted or rotated about the axis 125, as shown by rotational arrow 127, such that the notch insert 88 may be positioned over another one of the notches 22 which is different from the one the notch insert 88 had previously been positioned within. Further, upon the notch insert 88 being unlocked, the paper towel holder 12 may also be in an unlocked position adjacent to the use position or adjacent to the storage position such that the notch insert 88 may be positioned over the notch 22 for which the position corresponds. The coupling insert 78 may be spring biased downward via the spring 84 such that upon the user pivoting the notch insert 88 toward a desired notch 22, the notch insert 88 may readily move downward, as shown by arrow 131, into the desired notch once pivoted to that particular position, allowing the spring 84 to then decompress (see FIG. 4B). In this manner, the coupling insert 78 may be moved from one locked position to an unlocked position, and then pivoted toward another locked position, such as the before discussed use position or the storage position.

Figure 7:
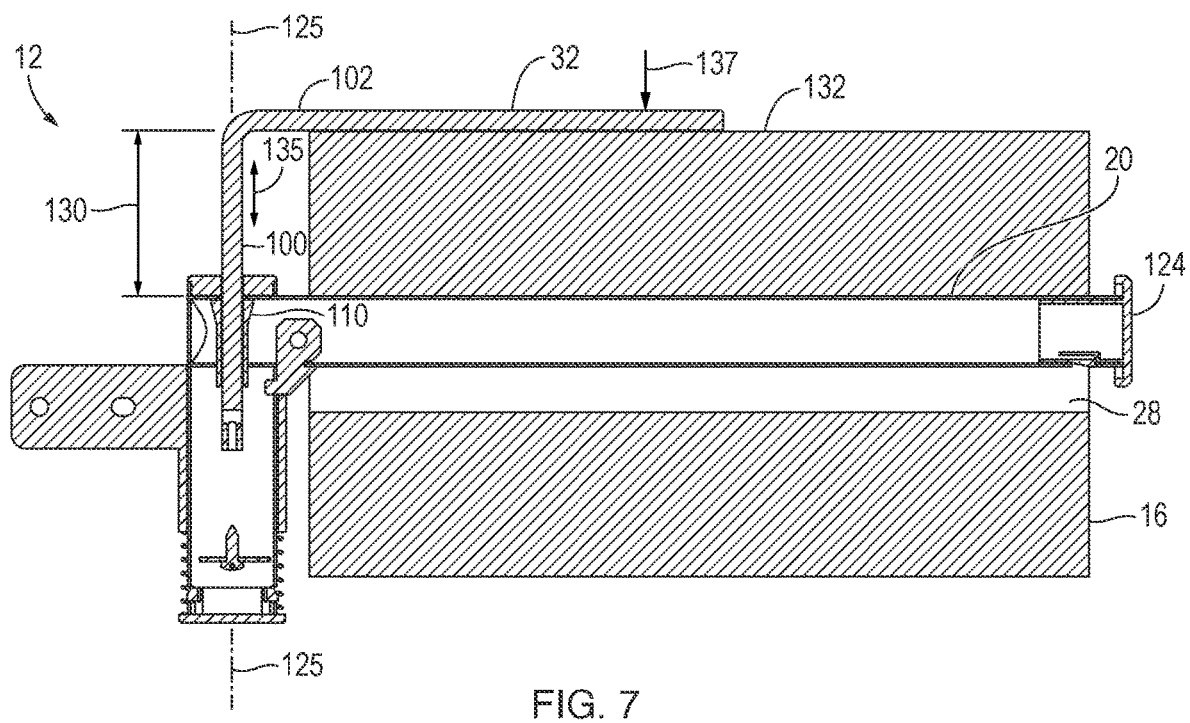
FIG. 7 is a cross-sectional view of the paper towel holder taken along section line 7-7 in FIG. 6, according to another embodiment of the present invention.

Now with reference to FIGS. 6 and 7, the arm 20 of the paper towel holder 12 may be sized and configured to fit the bore 28 of the paper towel roll 16 such that the paper towel roll 16 may rest on the arm 20. The arm 20 may extend linearly to the cap 124 such that the paper towel roll 16 may rest on the arm 20. Further, the arm 20 of the paper towel holder 12 may be sized and configured to be a portion of the size of the bore 28 of the paper towel roll 16. The cap 124 or lip may be sized and configured to keep the paper towel roll 16 from sliding off the arm 20. The weighted arm 32 may be lifted vertically such that the vertical portion 100 of the weighted arm 32 may become exposed from the casing 110 and the horizontal portion 102 may rest on the paper towel roll 16. Further, the weighted arm 32 may be lifted vertically such that the vertical portion 100 may extend a length 130 of the paper towel roll 16 to an edge 132 of the paper towel roll 16. Even further, the horizontal portion 102 of the weighted arm 32 may hold the paper towel roll 16 such that the paper towel roll 16 does not unravel. In one embodiment, the weighted arm 32 may freely move linearly, as shown by bi-linear arrow 133, along the axis 125 so that the weighted arm 32 continually applies a force, as shown by arrow 137, upon the outer surface of the paper towel roll 16. As such, as weighted arm 32 may prevent unraveling of the roll 16 and, as the roll is used and becomes smaller, the weighted arm 32 adjusts to the size of the paper towel roll 16.

Figure 8:
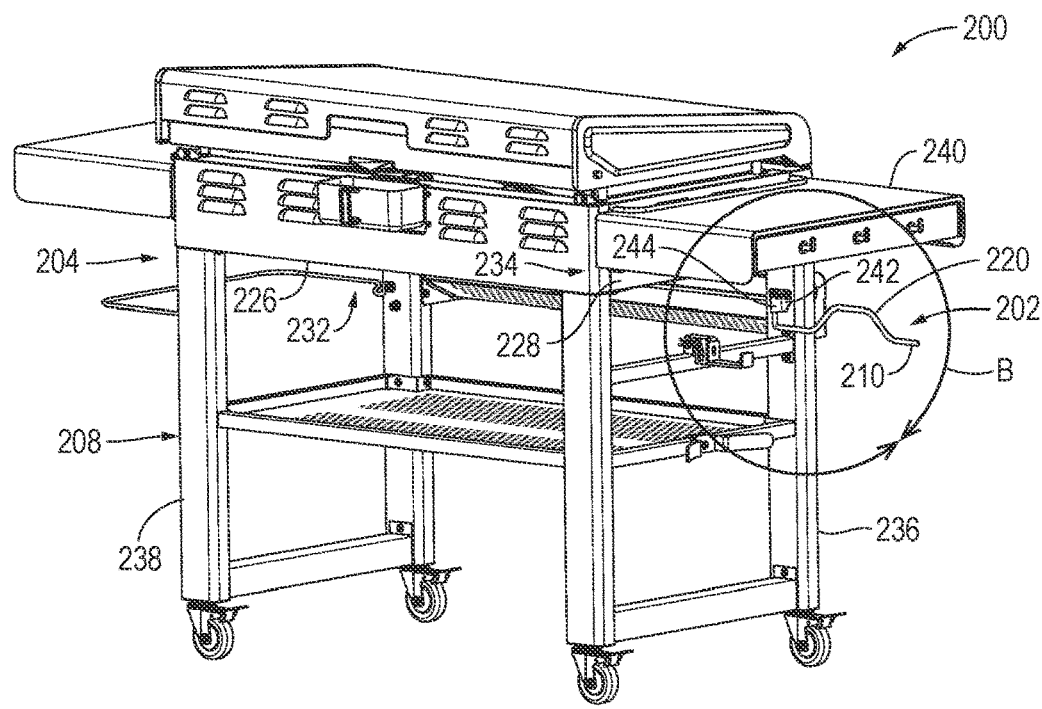
FIG. 8 is a rear perspective view of another embodiment of a paper towel holder associated with outdoor cooking system, according to another embodiment of the present invention.
Figure 8A:
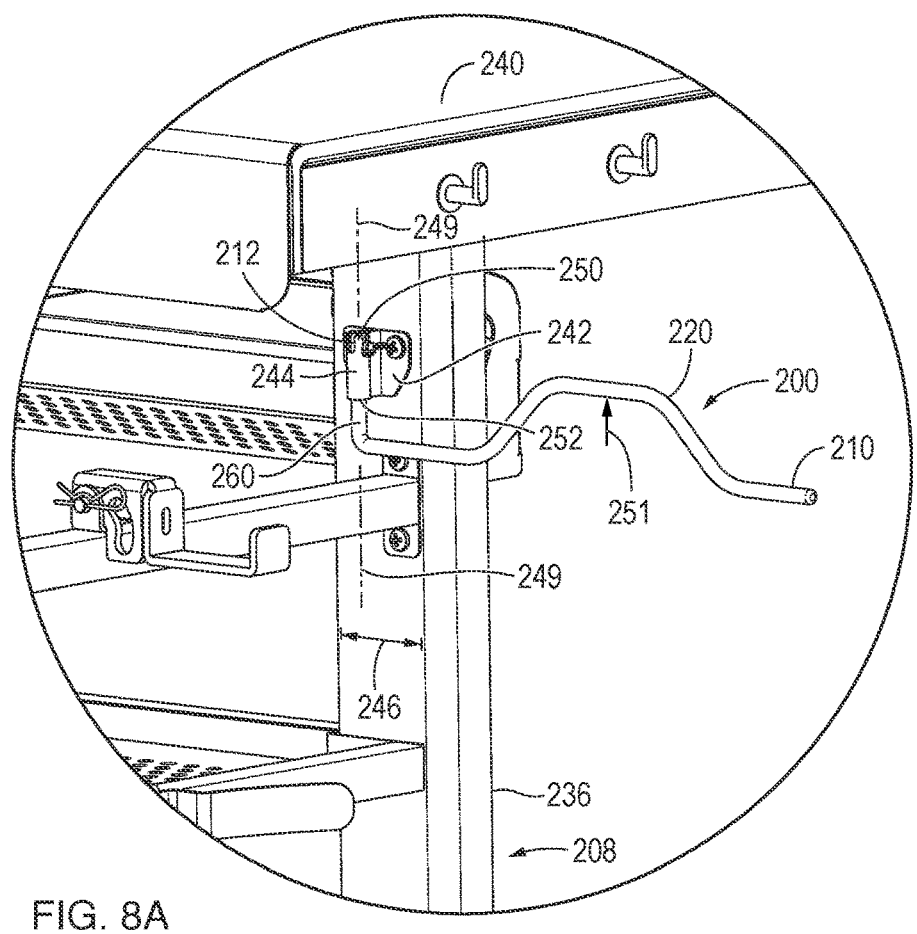
FIG. 8A is an enlarged view of a portion of the outdoor cooking system taken from region B in FIG. 8, depicting the paper towel holder in a locked use position, according to another embodiment of the present invention.
Figure 8B:
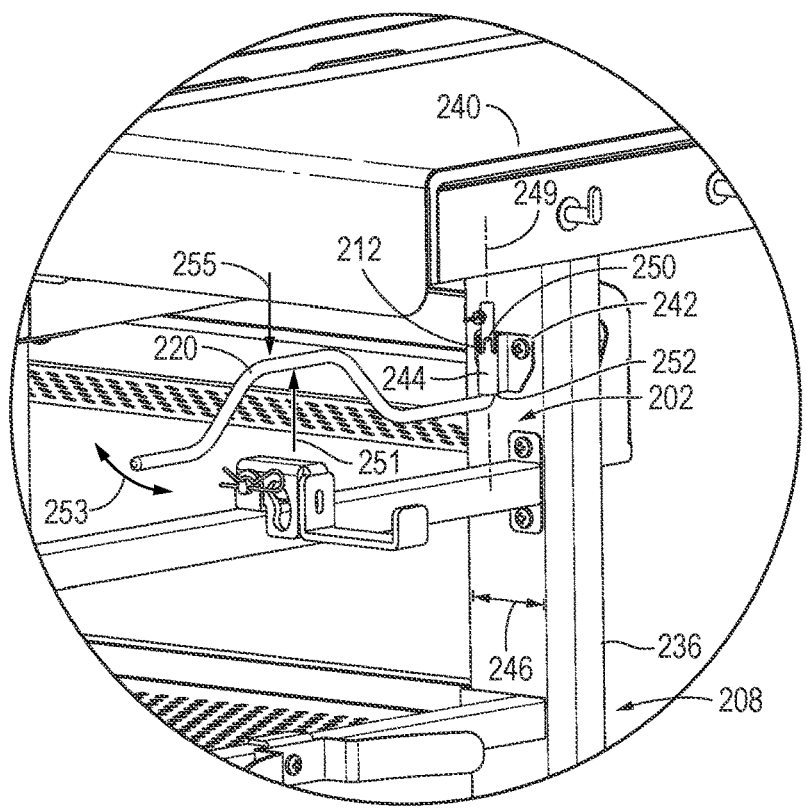
FIG. 8B is an enlarged view of the outdoor cooking system, depicting the paper towel holder in an unlocked position, according to another embodiment of the present invention.
Figure 8C:
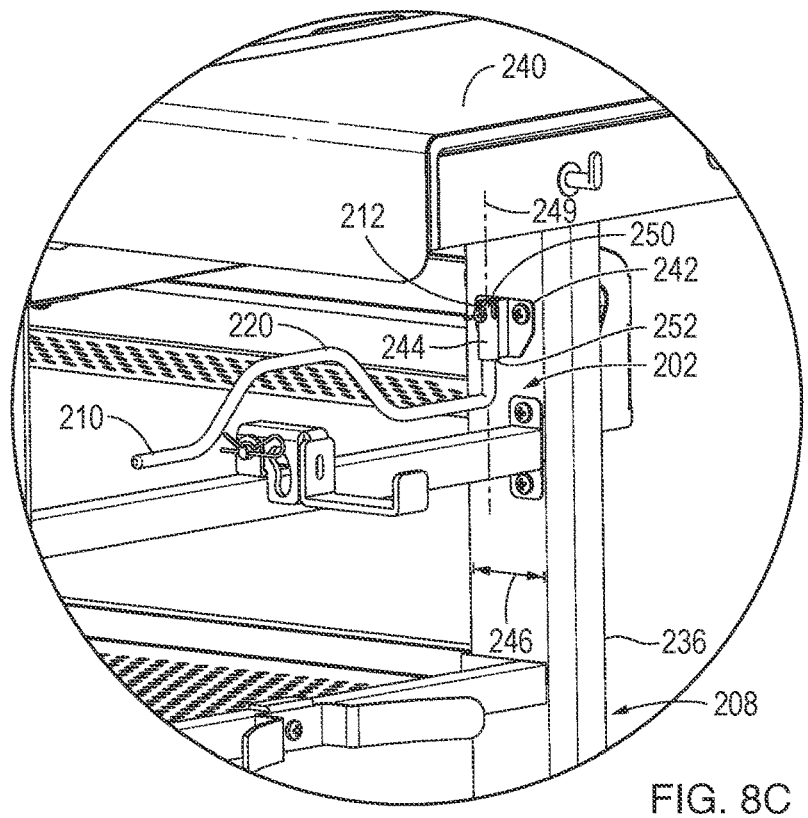
FIG. 8C is an enlarged view of the outdoor cooking system, depicting the paper towel holder in a locked storage position, according to another embodiment of the present invention.
Figure 11:
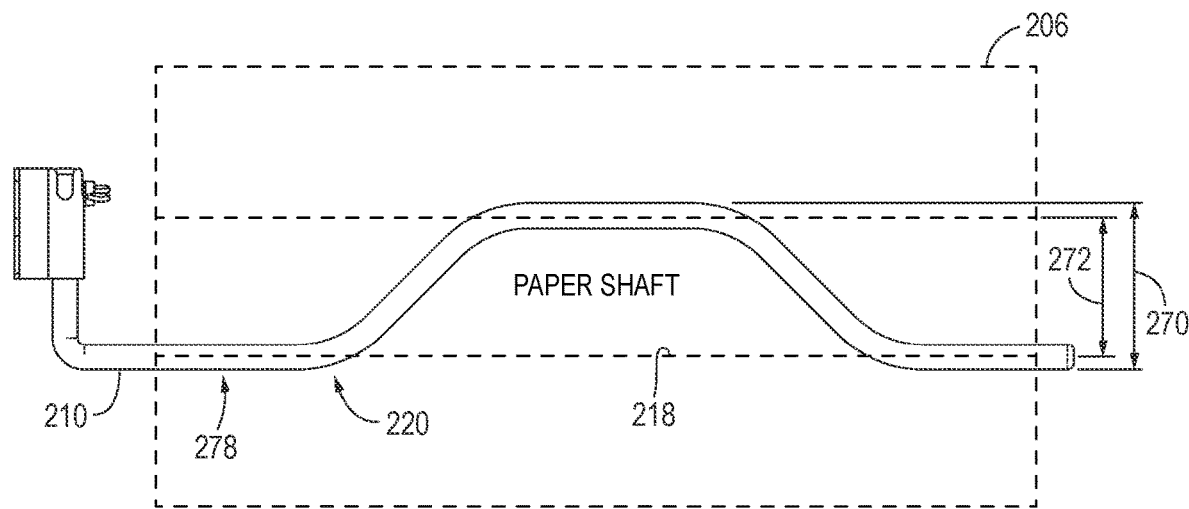
FIG. 11 is a side view of the paper towel holder, depicting an arm of the paper towel holder extending with bends and depicting a sizing of a bore of the paper towel roll relative to the arm with the bends, according to another embodiment of the present invention.
Figure 12:
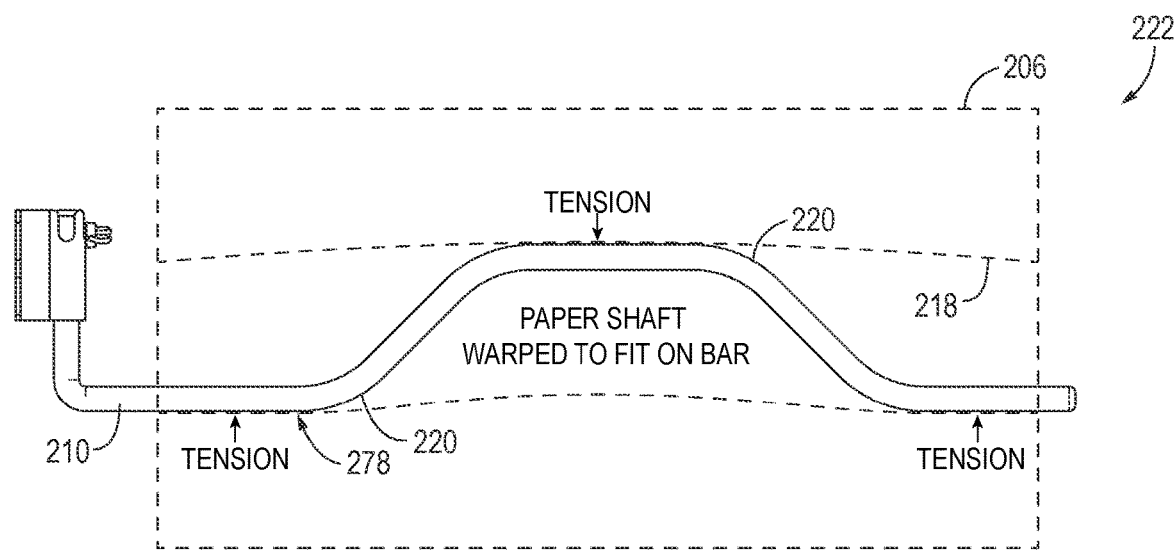
FIG. 12 is a side view of the paper towel holder, depicting the arm with the bends in a tensioned position within the bore of the paper towel roll on the arm with the bends of the paper towel holder, according to another embodiment of the present invention.

Now referring to FIG. 8, another embodiment of an outdoor cooking system 200 with a paper towel holder 202 is provided. Similar to the previous embodiment, the outdoor cooking system 200 or cooking station may include a main body 204 and a paper towel holder 202 sized and configured to be coupled to the main body 204 such that the paper towel holder 202 may be adjustable between a use position and a storage position with a paper towel roll 206 (FIG. 11) coupled thereto. Further, in one embodiment, the paper towel holder 202 may be sized and configured to be coupled to vertically extending legs 208 of the main body 204 such that an arm 210 of the paper towel holder 202 may extend substantially perpendicular relative to the legs 208. Further, the paper towel holder 202 may include at least two notches 212 or three notches 212 such that the arm 210 is pivotably adjustable from a use position (FIG. 8A) to a storage position (FIG. 8C). The arm 210 of the paper towel holder 202 may be sized to fit a bore 218 (FIG. 11) of the paper towel roll 206 (FIG. 11). The arm 210 may extend to define bends 220 such that the bore 220 of the paper towel roll 206 (FIG. 11) has an interference fit 222 (FIG. 12). The arm 210 with the bends 220 may hold the bore 218 (FIG. 11) of the paper towel roll 206 (FIG. 11) with tension such that the paper towel roll 206 (FIG. 11) may be coupled thereto and unable to turn.

Now with reference to FIGS. 8-8C, as previously set forth, the outdoor cooking system 200 may include the main body 204. The main body 204 may extend to define a front panel 224, rear panel 226, left panel 228, and right panel 230 each extending to define an inner portion 232. The inner portion 232 of the main body 204 may include heating elements supported thereto such as gas burners. Further, the main body may include an ignition button, gas line, burner knobs and the necessary components and connections to the gas burners for the burners to be operable to produce heat as known to one of ordinary skill in the art, similar to the previous embodiment. The left panel 228 and right panel 230 may extend to define the legs such that the legs may extend from corners 234 where the right panel 230 is coupled to the front and rear panel 224, 226 defining right legs 236 and the left panel 228 is coupled to the front and rear panel 224, 226 defining left legs 238. The legs 208 may extend vertically towards a ground surface. Further, the legs 208 may include accessories attached or coupled thereon, such as the paper towel holder 202.

Figure 9:
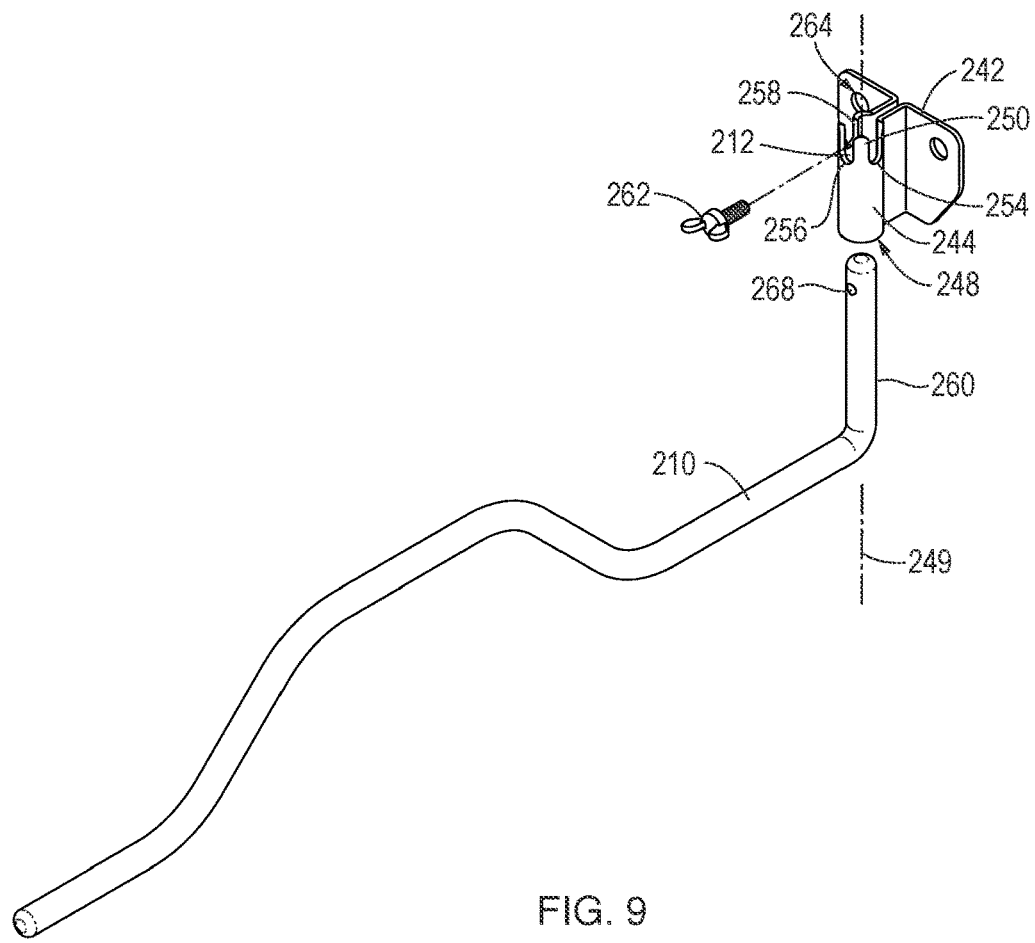
FIG. 9 is an exploded view of the paper towel holder, according to another embodiment of the present invention.
Figure 10:
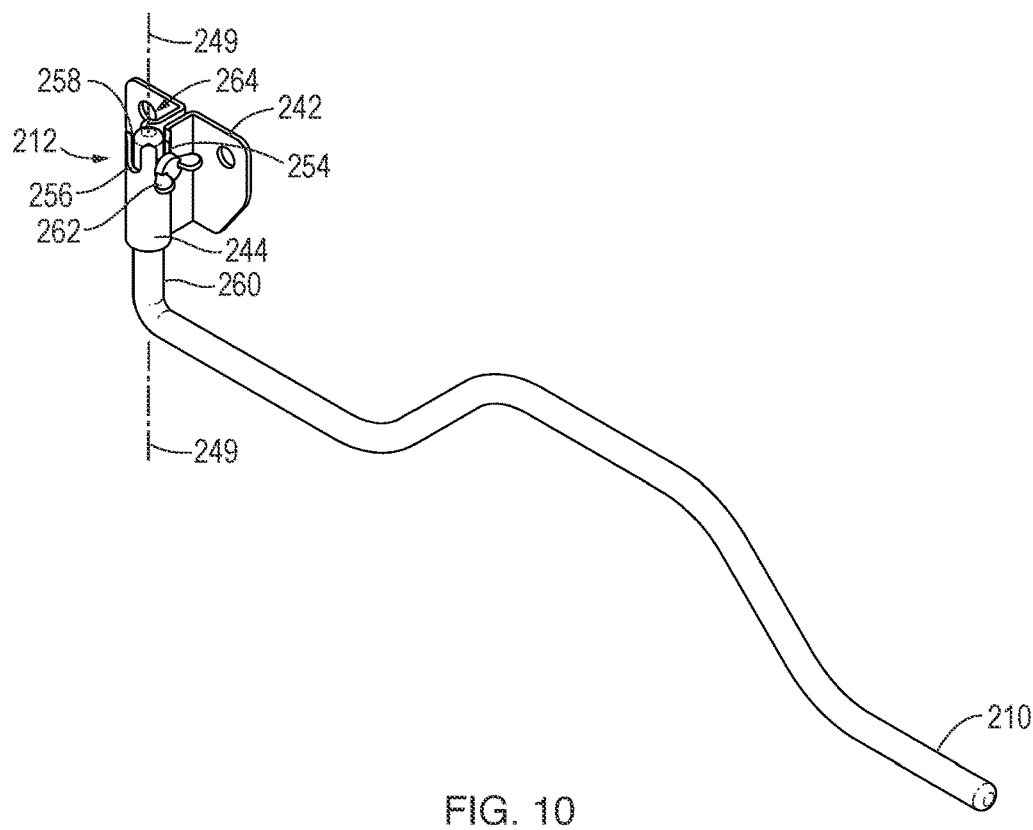
FIG. 10 is a perspective view of the paper towel holder, depicting the paper towel holder in the locked storage position, according to another embodiment of the present invention.

The paper towel holder 202 may be attached along the length of the right or left legs 236, 238 of the main body 204. Further, the paper towel holder 202 may be attached to other portions of the main body 204 such as the left or right panel 228, 230 of the main body 204 or a side shelf 240. The paper towel holder 202 may extend to include a bracket 242, a sleeve 244, and the arm 210. In one embodiment, the bracket 242 may be coupled to the legs 208 of the main body 204 such that the bracket 242 may extend within a width 246 of the legs 208. The sleeve 244 may define an axis 249 extending axially therethrough and may be coupled to the bracket 242 such that the sleeve 244 and axis 249 may extend vertically and may be positioned within the width of the legs 208. The sleeve 244 may extend to define multiple cross-sectional hollow shapes, such as circular or square, such that the sleeve 244 may extend to define a hollow center 248 (FIG. 9) or hollow portion. Further, the sleeve 244 may extend to define a first end 250 and second end 252. The first end 250 may extend to define at least two notches or the three notches 212 such that one notch is positioned on each side of the sleeve 244, excluding the side for which the sleeve 244 is coupled to the bracket 242. The notches 212 may define a front notch 254, center notch 256, and rear notch 258. The front notch 254 may correspond with the use position (FIG. 8A) while the center notch 256 and rear notch 258 may correspond with the storage positions (FIG. 8C). In another embodiment, the at least two notches 212 defined in one end of the sleeve 244 may correspond to the arm 210 being in at least one use position or at least one storage position.

Now with reference to FIGS. 8A-8C, 9 and 10, the hollow center 248 of the sleeve 244 may be sized and configured to receive a coupling insert 260 such that the coupling insert 260 may be moveable within the hollow center 248 defined by the sleeve 244. The coupling insert 260 may be coupled to the arm 210 such that the arm 210 extends substantially perpendicular from the coupling insert 260 and the axis 249. In one embodiment, the coupling insert 260 may extend continuously to or integrally with the arm 210. Further, the coupling insert 260 may extend from the first end 250 of the sleeve 244, through the hollow center 248, and out of the hollow center 248 on the second end 252 of the sleeve 244 such that the arm 210 may extend from the coupling insert 260 of which is extending from the second end 252 of the sleeve 244. The coupling insert 260 of this embodiment may also include a notch insert in the form, for example, of a pin 262 sized and configured to slide into the notches 212 and lock the coupling insert 260 and arm 210 in place. In one embodiment, the pin 262 may be removable from the coupling insert 260 such that the coupling insert 260 may be moveable to a desired one of the notches 212 in the sleeve 244. In another embodiment, the pin 262 may remain coupled to the coupling insert 260 such that the coupling insert 260 and arm 210 may be moved upward, as shown by arrow 251 (see FIG. 8B), within the sleeve 244 so that the pin 262 (or notch insert) moves out of one notch 212 and so that the coupling insert 260 and arm 210 may be rotated, as shown by arrow 253, about the axis 249 so that the pin 262 may move to another one of the notches 212. The coupling insert and arm may then be moved downward, as shown by arrow 255, into the desired notch. In this manner, the pin 262 may be maintained to the coupling insert 260 when moving the arm 210 to different positions and, further, the pin 262 may be maintained within a desired notch 212 via simply resting within a given one of the notches 212 (held by gravity). Further, the arm 210 may extend to define the bends 220 along a length of the arm such that the bore 218 (FIG. 11) of the paper towel roll 206 (FIG. 11) may receive the arm with an interference type fit (FIG. 12).

The bracket 242 may extend to define screw holes. The screw holes 264 may be sized and configured to take screws such that the screws may couple the bracket 242 to the main body 204 of the outdoor cooking system 200. Further, the bracket 242 may extend continuously to define the sleeve 244 such that the bracket 242 and sleeve 244 may be integrally formed (see FIG. 8A). In one embodiment, the sleeve and bracket may be a single one piece structure. In another embodiment, the sleeve and bracket may be a monolithic structure. The notches 212 of the sleeve 244 may be positioned on the first end 250 of the sleeve 244, similar to the previous embodiment. Further, the notches 212 of the sleeve 244 may correspond to the use position (FIG. 8A) or the storage position (FIG. 8C). For example, the front notch 254 may correspond to the use position and the center notch 256 and rear notch 258 may correspond to two different storage positions. The coupling insert 260 may include a pin hole 268 sized and configured to fit the pin 262 such that the pin 262 may extend into the pin hole 268 when locking the coupling insert 260 and arm 210 in place. The pin 262 may lock the coupling insert 260 and arm 210 in the position for which the notch 212 corresponds. Further, the coupling insert 260 and arm 210 may be unlocked when the pin 262 is untightened or retracted from the pin hole 268 and notch 212. The coupling insert 260 may be adjusted by simply lifting the coupling insert 260 upward from the sleeve 244, and rotating or pivoting the pin to be aligned with the desired notch, and then moving the coupling insert 260 downward so that the pin becomes positioned in the desired notch, as previously described.

Now with reference to FIGS. 11 and 12, the arm 210 with the bends 220 may expand with a height 270 which may exceed a diameter 272 of the bore 218 of the paper towel roll 206 when the arm 210 with the bends 220 is in a relaxed position 274. Further, the arm 210 with the bends 220 may be flexible or may be flexed such that the arm may be moved to a tension state. As such, upon the arm being inserted within the bore 218 of the paper towel roll 206, the arm may flex and be moved to the tension state, as depicted in FIG. 12. In this manner, the paper towel roll 206 may be positioned and maintained on the arm with the interference type fit such that the arm 210 with the bends 220 may be in the tension state. Further, as depicted in FIG. 12, as portions of the arm flex and are in the tension state within the bore of the paper towel roll 206, the structure defining the bore 218 of the paper towel roll 206 may also flex. As such, in windy conditions, the arm 210 with the bends 220 may secure the paper towel roll 206 to the arm with an interference type fit so as to prevent the paper towel roll from turning and becoming unraveled.

Figure 13:
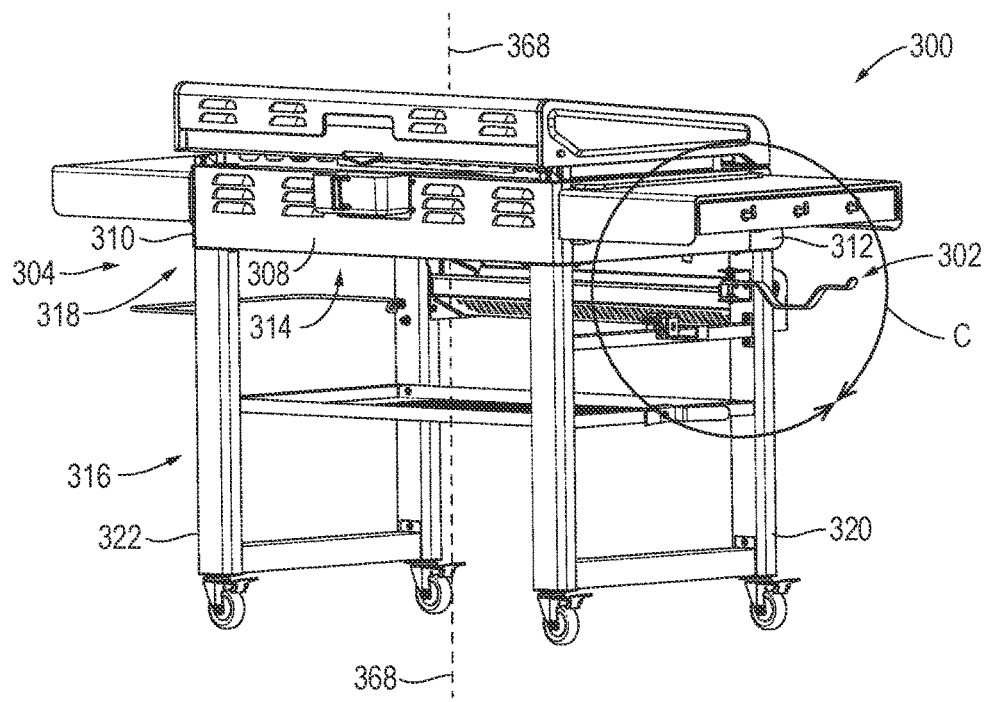
FIG. 13 is a rear perspective view of another embodiment of a paper towel holder associated with an outdoor cooking system, according to another embodiment of the present invention.

Now with reference to FIG. 13, another embodiment of a cooking station 300 with a paper towel holder 302 is provided. Similar to previous embodiments, the cooking station 300 may include a main body 304 and the paper towel holder 302. The paper towel holder 302 may be coupled to the main body 304. The main body 304 may extend to define a front panel 306, a rear panel 308, a left panel 310, and a right panel 312 such that the front panel 306, rear panel 308, left panel 310, and right panel 312 may extend to define an inner portion 314. The inner portion 314 may be sized and configured to support heating elements such as gas burners. Further, the main body 304 may include an ignition button, gas line, burner knobs, and the necessary components and connections to the gas burners for the burners to be operable to produce heat as known to one of ordinary skill in the art, similar to the previous embodiments. The front panel 306 and rear panel 308 may extend to define legs 316 such that the legs 316 extend from corners 318 where the front panel 306 is coupled to the left and right panel 310, 312 defining frontward legs 320 and the rear panel 308 is coupled to the left and right panel 310, 312 defining rearward legs 322. The legs 316 may extend vertically towards a ground surface. Further, the legs 316 may include accessories attached or coupled thereon, such as the paper towel holder 302, where, the paper towel holder 302 may extend at least partially perpendicular to the vertically extending legs 316. The paper towel holder 302 may be positioned and coupled to the length of the frontward legs 320 or the rearward legs 322.

Figure 13A:
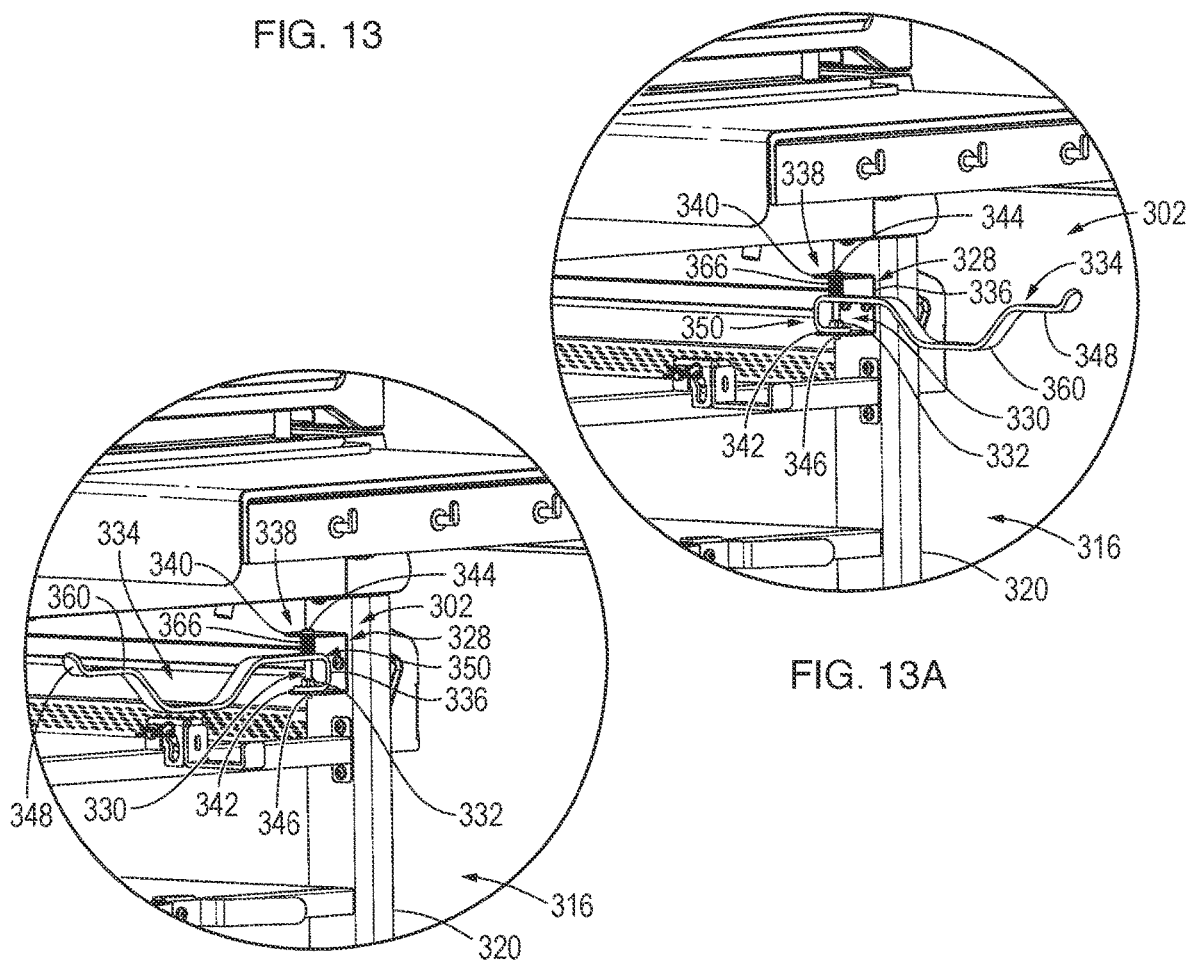
FIG. 13A is an enlarged view of a portion of the outdoor cooking system taken from region C in FIG. 13, depicting the paper towel holder in a locked use position, according to another embodiment of the present invention.
Figure 13B:
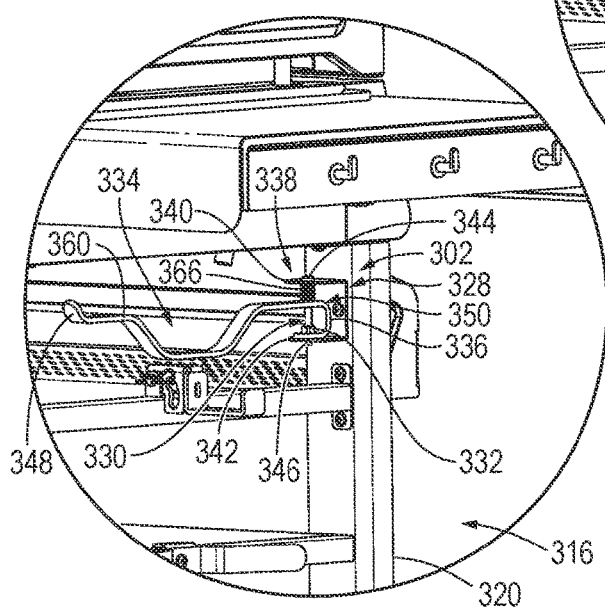
FIG. 13B is an enlarged view of the outdoor cooking system, depicting the paper towel holder in a locked storage position, according to another embodiment of the present invention.

Now with reference to FIGS. 13A, 13B, 14, and 17, as previously set forth, the paper towel holder 302 may be positioned and coupled to the length of the frontward legs 320 (or the rearward legs 322), where the paper towel holder 302 may be sized and configured to be adjustable between a use position (FIG. 13A) and a storage position (FIG. 13B). The paper towel holder 302 may include a bracket 328, a pin 330, a post 332, and an arm 334. The bracket 328 may extend in a c-configuration or u-configuration to define a central portion 336 and wings 338. The wings 338 may extend from the central portion 336 to define a u configuration. Further, the bracket 328 may be coupled to the legs 316 of the main body 304 such that the central portion 336 may extend parallel to the legs 316 and the wings 338 may extend perpendicular from the central portion 336 and the legs 316. The central portion 336 may be coupled to the legs 316 by screws or pins such that the bracket 328, and thus, the paper towel holder 302, may be removable and positioned on a different leg 316 of the main body 304. The wings 338 of the bracket 328 may define an upper wing 340 and lower wing 342. The upper wing 340 and the lower wing 342 may extend adjacent and parallel to each other. Further, the wings 338 may be sized and configured for the pin 330 to extend from the upper wing 340 to the lower wing 342 such that the pin 330 extends through respective openings defined in the upper and lower wings 340, 342. The upper and lower wings 340, 342 may also be referenced as upper and lower extensions of a c-shaped structure or the c-configuration.

As previously set forth, the pin 330 may be sized and configured to extend from the upper wing 340 and lower wing 342 of the bracket 328. The pin 330 may also be a screw. Further, the pin may include a head 344 positioned above the upper wing 340 such that the pin 330 may extend through the upper wing 340 to a lower wing 342 to define an end 346 positioned below the lower wing 342. Further, the pin 330 may include threads such that the pin may be threaded through the upper wing 340 and/or lower wing 342 such that the pin 330 is not simply adjustable or moveable when the paper towel holders 302 position is changed. The paper towel holder 302 may also include the post 332, where the post 332 may be coupled to the lower wing 342 of the bracket 328. The post 332 may be a sleeve like structure and may be fixed to the lower wing 342. The post 332 may be sized and configured to receive the pin 330 such that the pin 330 may extend through openings defined in the upper wing 340, the post 332 and the lower wing 342. As such, the post 332 may include a post bore sized to receive the pin 330 so that the post bore may define an axis configured to extend co-axial with a longitudinal axis 331 (FIG. 14) of the pin 330. Further, the post 332 may be coupled to the lower wing 342 and may be threaded such that the pin 330 may thread through the post 332.

The arm 334 may be rotatably coupled to the pin 330 such that the arm 334 may extend substantially perpendicular to the pin 330. Further, the arm 334 may extend continuously to define a holder portion 348 and a coupling portion 350 with several bends therealong. The coupling portion 350 may extend in a c-configuration to define an upper portion 352, a middle portion 354, and a lower portion 356 where the upper portion 352 may extend continuously or be attached to the holder portion 348 of the arm 334. The upper portion 352 and lower portion 356 may extend perpendicular from the middle portion 354 to define the c-configuration. The upper portion 352 and lower portion 356 may extend continuously from the middle portion 354. Further, the coupling portion 350 may extend between the upper wing 340 and lower wing 342 of the bracket 328, such that, the coupling portion 350 may extend partially between the upper wing 340 and lower wing 342. As such, the lower portion 356 may be positioned on the lower wing 342 of the bracket 328 and the upper portion 352 may be positioned between the upper wing 340 and lower wing 342. The lower portion 342 may define an opening 358 such that the post 332 may extend through the opening 358. The post 332 and the opening 358 may extend to define a square or other shaped profile or outer periphery that does not allow sliding rotation. As such, the square shaped outer periphery may hold many different types of profiles, such as a non-round shaped outer periphery. The lower portion 356 may extend at least partially parallel to the lower wing 342 and the upper portion 352 may extend at least partially parallel to the upper wing 340. In this configuration the post 332 may extend through the lower portion 356 and the pin 330 may extend through the upper portion 352 to the post 332 such that the pin 330 may also extend through the lower portion 356 by way of the post 332. The arm 334, and more specifically, the holder portion 348 may extend to define bends 360 along the length of the arm 334 such that a bore 362 (FIG. 18) of the paper towel roll 363 (FIG. 18) may receive the arm 334 with an interference fit 364. Further, the arm 334 may extend with a flat structure extending the length of the arm 334.

As previously set forth, the pin 330 may extend from the upper wing 340 to the lower wing 342. Further, the coupling portion 350 may extend partially between the upper wing 340 and lower wing 342 of the bracket 328, where the lower portion 356 may be positioned on the lower wing 342 and the upper portion 352 may be positioned between the upper wing 340 and lower wing 342 of the bracket 328. In this configuration, the pin 330 may extend between the upper wing 340 and lower wing 342, and thus, the pin 330 may extend through the upper portion 352 and post 332 such that the pin 330 extends through the lower portion 356. Further, the pin 330 may include a spring 366 sized and configured to extend around the pin 330. The spring 366 may extend from the upper portion 352 to below the upper wing 340. The spring 366 may apply a biasing force between and against the upper portion 352 of the arm 334 and the underside of the upper wing 340 so as to bias the coupling portion 350 of the arm 334 to be maintained over the post 332. The opening 358 of the lower portion 356 may correspond with the shape of the post 332, for example, the post 332 and opening 358 may define a generally square profile or square like configuration such that the post 332 may position the arm 334 in different maintained orientations corresponding with the square profile of the post 332 and the opening 358 defined in the arm 334. The opening 358 may also be referenced as a keyed profile. The keyed profile may mean that the opening 358 may be sized and configured with a shape or profile that corresponds to fit over the post 332 in a manner that will lock the orientation or position of the arm to the post.

Now with reference to FIGS. 13A and 13B, as previously set forth, the arm 334 of the paper towel holder 302 may be adjustable to move to various orientations, such as between a use position (FIG. 13A) and a storage position (FIG. 13B). The paper towel holder 302 may be positioned on the frontward legs 320 or the rearward legs 322. The paper towel holder 302 may be in the storage position when the arm 334 may extend from the legs 316 towards the opposite leg 316, as shown in FIG. 13B. The paper towel holder 302 may be in the use position when the arm 334 may extend away from the legs 316 of the main body 304, as shown in FIG. 13A. The arm may be adjustable or moveable in at least two positions. In another embodiment, the arm may be adjustable to at least three positions dependent on where the paper towel holder 302 is coupled to the main body 304. The positions may correspond to the storage position or the use position and may also correspond dependent on the location for which the paper towel holder 302 is coupled to the main body 304. For example, the paper towel holder 302 may be positioned on the rearward legs 322 where the bracket 328 may be facing the frontward legs 320. In this configuration, the storage position may correspond to the arm 334 extending towards the frontward legs 320 or towards a central axis 368 of the main body 304.

Figure 14:
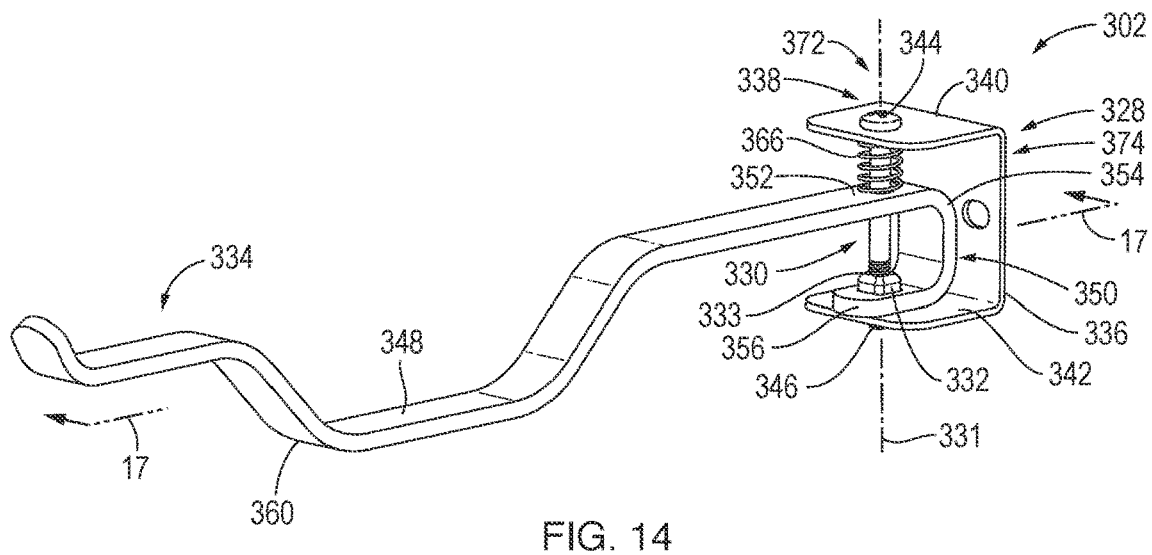
FIG. 14 is a perspective view of the paper towel holder, depicting the paper towel holder in the locked storage position, according to another embodiment of the present invention.
Figure 15:
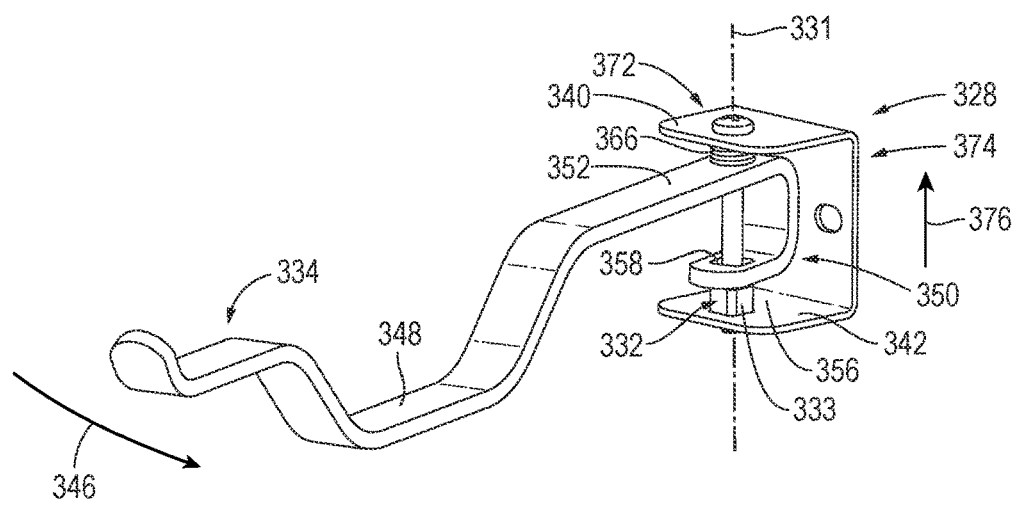
FIG. 15 is a perspective view of the paper towel holder, depicting the paper towel holder in an unlocked position, according to another embodiment of the present invention.
Figure 16:
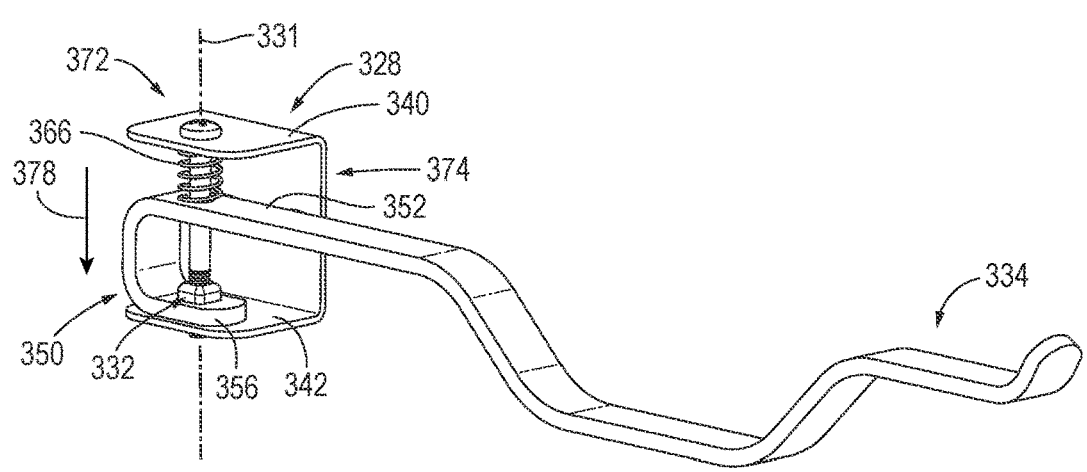
FIG. 16 is a perspective view of the paper towel holder, depicting the paper towel holder in the locked use position, according to another embodiment of the present invention.
Figure 17:
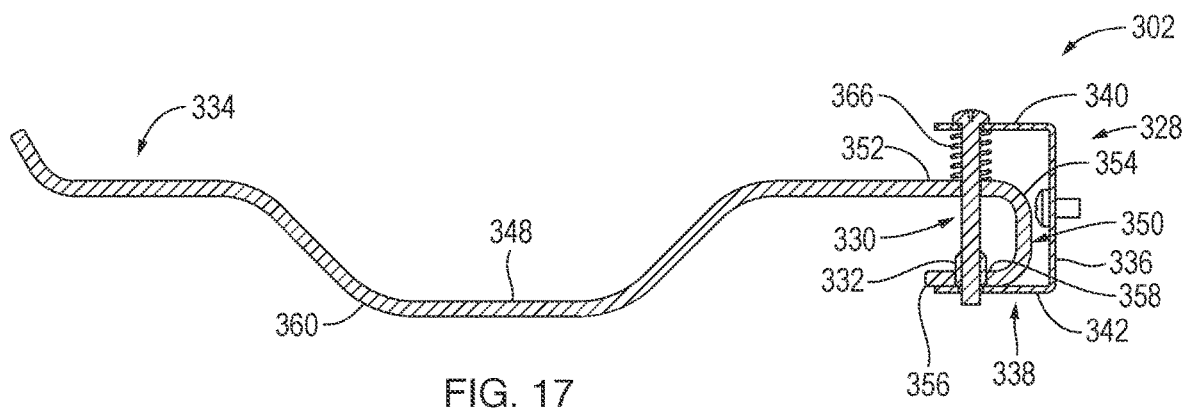
FIG. 17 is a cross-sectional view of the paper towel holder taken along section line 17-17 from FIG. 14, according to another embodiment of the present invention.

Now with reference to FIGS. 14-16, as previously set forth, the post 332 may lock the arm 334 from rotating about the axis 331 of the pin 330 and the spring 366 may bias the arm 334 over the post 332. The square shaped profile of an outer periphery 333 of the post 332 may facilitate locking the arm 334 in a particular orientation as well as facilitate re-orienting the arm 334 to another position or orientation and locking the arm 334 in such other position. For example, upon moving the arm 334 upwards, as shown by arrow 370, against the biasing force of the spring 366 so that the lower portion 356 of the arm 334 clears the post 332, the arm 334 may then be rotated about the axis 331 of the pin 330, as shown by arrow 376, to move the arm 334 to a different orientation or position, such as the use or storage positions previously set forth herein. As such, upon applying an upward force to the arm 334 against the biasing force of the spring 366, the spring 366 may compress and the opening 358 may be lifted away from the post 332 such that the arm 334 may be unlocked from the post 332. That is, the arm 334 may be unlocked when the lower portion 356 of the coupling portion 350 may be moved above the post 332 such that the post 332 does not extend within any portion of the opening 358 and where the spring 366 is being compressed by the upper portion 352 of the coupling portion 350.

With the arm 334 being in an unlocked position, the arm 334 may be pivotably adjustable to a left side 372 and/or right side 374 of the bracket 328. Further, the arm 334 may be adjustable to the right side 374 of the bracket 328 by motion being applied to the arm 334 towards the right side 372, as shown by arrow 376, such that, the arm 334 may be moved to the use position (FIG. 13A). The arm 334 may also be adjustable to the left side 372 of the bracket 328 by motion being applied to the arm 334 towards the left side 372. The arm 334 being positioned to either the left or right side 372, 374 of the bracket 328 may be locked by positioning the opening 358 over the post 332 until the post 332 fits and easily slides into the opening 358 and the arm 334 may move towards the lower wing 342 of the bracket 328, as shown by arrow 378. The square profile of the post 332 that corresponds with the square profile of the opening 358 prevents the arm 334 from pivoting or rotating about the axis 331 of the pin 330, thus causing the arm 334 to be in a locked position. As such, the arm 334 moving towards the lower wing 342 of the bracket 328 may lock the arm 334 around the post 332 to prevent rotational movement of the arm 334 and the spring 366 biasing the arm 334 over the post 332 maintains the arm in the locked position on the post 332.

Figure 18:
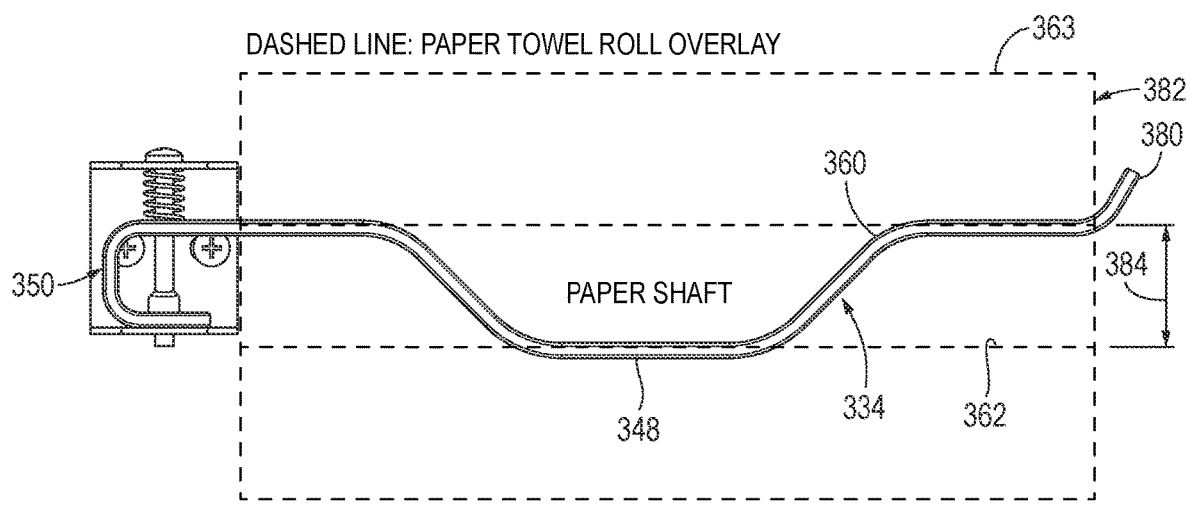
FIG. 18 is a side view of the paper towel holder, depicting an arm of the paper towel holder extending with bends and depicting a sizing of a bore of the paper towel roll relative to the arm with the bends, according to another embodiment of the present invention.
Figure 19:
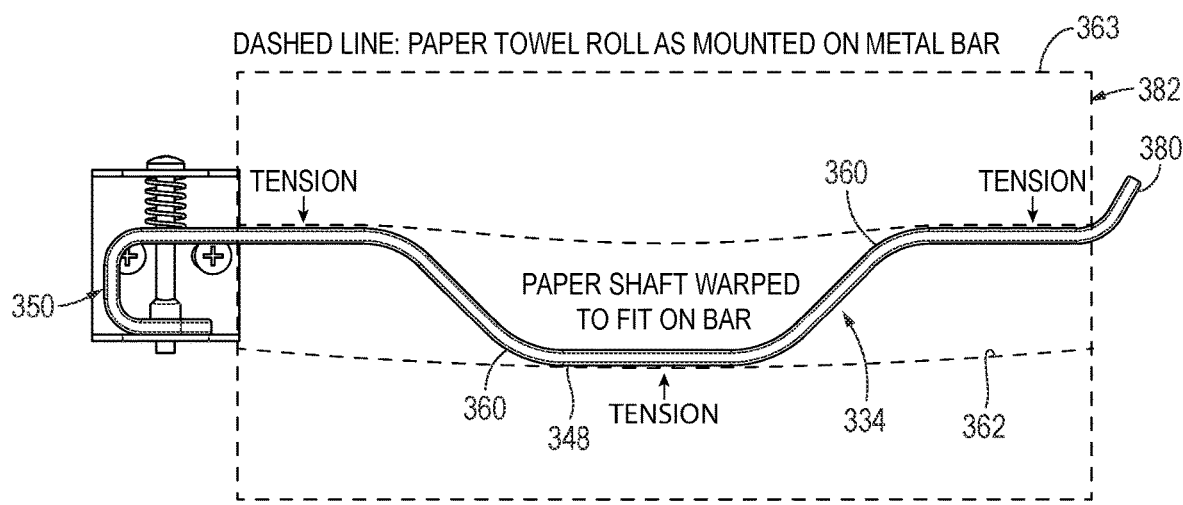
FIG. 19 is a side view of the paper towel holder, depicting the arm with the bends in a tensioned position within the bore of the paper towel roll on the arm with the bends of the paper towel holder, according to another embodiment of the present invention.

Now with reference to FIGS. 18 and 19, similarly to previous embodiments, the arm 334 may include bends 360 sized and configured to be flexible such that when the paper towel roll 363 is positioned on the arm 334 the bends 360 may flex for the arm 334 to move to a tension state. The arm 334 with the bends 360 may flex to a tension state such that the paper towel roll 363 doesn't turn or move in adverse weather, such as, for example, windy conditions. The holder portion 348 of the arm 334 may extend from the coupling portion 350 to a tilted edge 380 of the arm 334, such that the holder portion 348 may be sized to receive the bore 362 of the paper towel roll 363 and where the tilted edge 380 may be positioned on an exterior 382 of the paper towel roll 363. Further, the tilted edge 380 may be sized and configured to bend above the bore 362 to hold the paper towel roll 363 from movement in the longitudinal direction. The arm 334 with the bends 360 may be in a relaxed state when the paper towel roll 363 is not positioned thereon, such that, the arm 334 with the bends 360 may exceed a diameter 384 of the bore 362 of the paper towel roll 363 as shown in FIG. 18.

Upon the arm 334 being inserted within the bore 362 of the paper towel roll 363, the bore 362 may provide pressure to flex the arm 334 with the bends 360 such that the bore 362 may fit on the arm 334 and the arm 334 may be moved to the tension state, as depicted in FIG. 19, such that the paper towel roll 363 may be positioned and maintained in position on the arm 334 with the interference type fit 364. The arm 334 being in the tension state may cause the structure defining the bore 362 of the paper towel roll 363 to also slightly flex or morph, as depicted in FIG. 19, to provide further stability to the position of the paper towel roll 363. In another embodiment, the arm 334 may be stronger than the paper towel roll 363 such that the paper towel roll 363 flexes or warps toward the configuration or shape of the arm 334. As such, in this embodiment, the paper towel roll 363 may not rotate about the arm 334, but rather, may be in a stationary position so that outdoor conditions, such as wind, does not result in the unrolling of the paper towel roll 363.

The various structural components of the various embodiments of the paper towel holder set forth herein may be formed from metallic materials, such as stainless steel, steel or aluminum, or any other suitable metallic material, or may be formed from one or more polymeric materials, wood materials, or combinations of metallic, polymeric and wood materials, as known by one of ordinary skill in the art. Further, the components of the paper towel holder may be formed by employing known manufacturing techniques and processes, such as welding, molding, milling, drilling, bending, fastening, etc., as known to one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A paper towel holder configured to hold a paper towel roll for use on an outdoor cooking station, comprising:
    a bracket configured to be coupled to a main body of the cooking station, the bracket extending to define a c-shaped structure with an upper extension and a lower extension, the upper extension including an upper opening defined therein, the lower extension including a lower opening defined therein, the upper opening and the lower opening positioned to be aligned so as to axially define an axis therethrough and between each of the upper and lower openings;
    a sleeve defining a bore extending therethrough, the sleeve positioned between the upper and lower extensions and adjacent one of the upper and lower extensions such that a bore axis of the sleeve is coaxial with the axis of the upper and lower openings, the sleeve having a non-round shaped outer periphery;
    a pin configured to be positioned through the bore and upper and lower openings of the respective upper and lower extensions;
    a spring configured to be positioned between the upper and lower extensions and coupled to the pin;
    an arm sized and configured to receive the paper towel roll, the arm having multiple bends along a length of the arm, the arm having one end portion with at least one arm opening with a keyed profile, the keyed profile configured to correspond with the non-round shaped outer periphery of the sleeve, the one end portion of the arm configured to be coupled to the pin with the pin extending through the at least one arm opening.

2. The paper towel holder of claim 1, wherein the arm is positionable relative to the main body of the cooking station in at least one of a use position and a storage position.

3. The paper towel holder of claim 2, wherein the arm may be moved between the use and storage positions by compressing the spring so that the at least one arm opening of the arm is withdrawn from the sleeve so that the arm may be rotated about the axis.

4. The paper towel holder of claim 1, wherein the arm extends with a flat structure with the bends to minimize movement of the paper towel roll on the arm.

5. The paper towel holder of claim 1, wherein the bends along the length of the arm include at least four bends.

6. The paper towel holder of claim 1, wherein the arm includes a free end, the arm extending upward to the free end of the arm.

7. The paper towel holder of claim 1, wherein the non-round shaped outer periphery of the sleeve comprises a square shaped outer periphery.

8. A cooking station configured to hold a paper towel roll thereto, the cooking station comprising:
    a main body with heating elements supported therewith; and
    a paper towel holder, the paper towel holder includes:
        a bracket configured to be coupled to the main body, the bracket extending to define a c-shaped structure with an upper extension and a lower extension, the upper extension including an upper opening defined therein, the lower extension including a lower opening defined therein, the upper opening and the lower opening positioned to be aligned so as to axially define an axis therethrough and between each of the upper and lower openings;
        a sleeve defining a bore extending therethrough, the sleeve positioned between the upper and lower extensions and adjacent one of the upper and lower extensions such that a bore axis of the sleeve is coaxial with the axis of the upper and lower openings, the sleeve having a non-round shaped outer periphery;
        a pin configured to be positioned through the bore and upper and lower openings of the respective upper and lower extensions;
        a spring configured to be positioned between the upper and lower extensions and coupled to the pin; and
        an arm sized and configured to receive the paper towel roll, the arm having multiple bends along a length of the arm, the arm having one end portion with at least one arm opening with a keyed profile, the keyed profile configured to correspond with the non-round shaped outer periphery of the sleeve, the one end portion of the arm configured to be coupled to the pin with the pin extending through the at least one arm opening.

9. The paper towel holder of claim 8, wherein the arm is positionable relative to the main body of the cooking station in at least one of a use position and a storage position.

10. The paper towel holder of claim 9, wherein the arm may be moved between the use and storage positions by compressing the spring so that the at least one arm opening of the arm is withdrawn from the sleeve so that the arm may be rotated about the axis.

11. The paper towel holder of claim 8, wherein the arm extends with a flat structure with the bends to minimize movement of the paper towel roll on the arm.

12. The paper towel holder of claim 8, wherein the bends along the length of the arm include at least four bends.

13. The paper towel holder of claim 8, wherein the arm includes a free end, the arm extending upward to the free end of the arm.

14. The paper towel holder of claim 8, wherein the non-round shaped outer periphery of the sleeve comprises a square shaped outer periphery.

15. A method for maintaining a paper towel roll in a stationary position and connected to an outdoor cooking station, the method comprising:

providing a paper towel holder having a bracket, a sleeve, a pin, a spring and an arm, the bracket extending to define a c-shaped structure with an upper extension and a lower extension, the upper and lower extensions define an upper opening and a lower opening therein, respectively, such that the upper and lower openings are aligned so as to axially define an axis through the upper and lower openings, the sleeve defining a bore and positioned between the upper and lower extensions and adjacent one of the upper and lower openings, the sleeve having a non-round shaped outer periphery, the pin configured to be positioned through the bore and the upper and lower openings of the respective upper and lower extensions, the arm having multiple bends along a length of the arm, the arm having one end portion with at least one arm opening with a keyed profile, the keyed profile configured to correspond with the non-round shaped outer periphery of the sleeve such that the one end portion of the arm is configured to be coupled to the pin with the pin extending through the at least one arm opening; and positioning a paper towel roll over the bends of the arm so that a paper shaft of the paper towel roll warps over the arm and becomes stationary relative to the arm.

16. The method according to claim 15, further comprising moving the arm of the paper towel holder from a use position to a storage position.

17. The method according to claim 16, wherein the moving comprises compressing the spring so that the at least one arm opening of the arm is withdrawn from the sleeve so that the arm is moveable to rotate about the axis.

* * * * *